(12) United States Patent
Regev et al.

(10) Patent No.: US 12,494,959 B2
(45) Date of Patent: Dec. 9, 2025

(54) ADAPTIVE DETERMINATION OF CONSTELLATION POINT USAGE PROBABILITIES

(71) Applicant: QUALCOMM Incorporated, San Diego, CA (US)

(72) Inventors: Aviv Regev, Tel Aviv (IL); Elad Meir, Ramat Gan (IL); Amit Bar-Or Tillinger, Tel Aviv (IL); Ronen Shaked, Kfar Saba (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 18/462,198

(22) Filed: Sep. 6, 2023

(65) Prior Publication Data

US 2025/0080390 A1    Mar. 6, 2025

(51) Int. Cl.
*H04L 27/34* (2006.01)
*H04W 24/02* (2009.01)

(52) U.S. Cl.
CPC ......... *H04L 27/3405* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 2013/0336649 A1* | 12/2013 | Essiambre | H04L 1/0003 398/25 |
| 2023/0403071 A1* | 12/2023 | Chen | H04L 27/3405 |
| 2024/0039777 A1 | 2/2024 | Meng et al. | |
| 2025/0184204 A1* | 6/2025 | Jin | H04L 27/3405 |

FOREIGN PATENT DOCUMENTS

| | | |
|---|---|---|
| CN | 111163031 A | 5/2020 |
| WO | WO-2022054231 A1 | 3/2022 |
| WO | WO-2022218208 A1 | 10/2022 |

OTHER PUBLICATIONS

International Search Report and Written Opinion—PCT/US2024/042913—ISA/EPO—Nov. 26, 2024 (2305884WO).

* cited by examiner

*Primary Examiner* — Diane L Lo
(74) *Attorney, Agent, or Firm* — Holland & Hart LLP

(57) ABSTRACT

Methods, systems, and devices for wireless communication are described. A request associated with probabilities of respective points of a constellation for communication of a set of data symbols using a channel may be received. The channel may be between a wireless device and a network entity. The probabilities may indicate respective likelihoods of the respective points being used in the communication of the set of data symbols. Signaling may be communicated in accordance with the set of probabilities of the respective points, where the set of probabilities may be adapted to characteristics of radio frequency impairments associated with the channel. The characteristics of the radio frequency impairments may be measured by a wireless device.

30 Claims, 14 Drawing Sheets

ADAPTIVE DETERMINATION OF CONSTELLATION POINT USAGE PROBABILITIES

FIELD OF TECHNOLOGY

The following relates to wireless communication, including adaptive determination of constellation point usage probabilities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Modulation and coding techniques may be used to support wireless communications between devices in a wireless communications system. Modulation techniques may be associated with constellations of points that correspond to unique symbols that are communicated between wireless devices to convey unique data values. In some examples, for a data stream, the probability (which may be referred to as a prior probability) of any point in a constellation being used to communicate a set of data in the data stream is the same across the constellation—that is, the prior probabilities for the points in the constellation may be uniform. In some examples, radio frequency (RF) impairments to communications between wireless devices may non-uniformly affect the points of a constellation. In such cases, a performance of a uniform prior probability distribution may be inferior to a performance of a non-uniform prior probability.

SUMMARY

Mechanisms (e.g., techniques, configurations, components) that support adapting prior probabilities to changing RF impairments in a wireless communication environment are disclosed herein.

To adapt prior probabilities for communications in a wireless communication environment with changing RF impairments, a network entity may communicate, to a user equipment (UE), a request associated with configuring prior probabilities of a constellation. In some examples, the request may ask the UE to calculate and report preferred prior probabilities for the RF impairments associated with the channel between network entity and the UE. The network entity may then configure subsequent communications with the reported prior probabilities. In other examples, the request may ask the UE to evaluate and report RF impairments associated with the channel between the network entity and the UE. The network entity may then use the reported RF impairments to calculate preferred prior probabilities for the RF impairments and may configure subsequent communications with the calculated prior probabilities.

A method for wireless communication by a user equipment (UE) is described. The method may include receiving, from a network entity, a request associated with probabilities of respective points of a constellation for communication of a set of data symbols over a channel between the UE and the network entity, where the probabilities indicate respective likelihoods of the respective points being used in the communication of the set of data symbols and communicating, with the network entity, signaling in accordance with a set of probabilities of the respective points, where the set of probabilities are adapted to characteristics of RF impairments associated with the channel that are measured by the UE.

A UE for wireless communication is described. The UE may include one or more memories storing processor executable code, and one or more processors coupled with the one or more memories. The one or more processors may individually or collectively operable to execute the code to cause the UE to receive, from a network entity, a request associated with probabilities of respective points of a constellation for communication of a set of data symbols over a channel between the UE and the network entity, where the probabilities indicate respective likelihoods of the respective points being used in the communication of the set of data symbols and communicating, with the network entity, signal in accordance with a set of probabilities of the respective points, where the set of probabilities are adapted to characteristics of RF impairments associated with the channel that are measured by the UE.

Another UE for wireless communication is described. The UE may include means for receiving, from a network entity, a request associated with probabilities of respective points of a constellation for communication of a set of data symbols over a channel between the UE and the network entity, where the probabilities indicate respective likelihoods of the respective points being used in the communication of the set of data symbols and means for communicating, with the network entity, signaling in accordance with a set of probabilities of the respective points, where the set of probabilities are adapted to characteristics of RF impairments associated with the channel that are measured by the UE.

A non-transitory computer-readable medium storing code for wireless communication is described. The code may include instructions executable by a processor to receive, from a network entity, a request associated with probabilities of respective points of a constellation for communication of a set of data symbols over a channel between the UE and the network entity, where the probabilities indicate respective likelihoods of the respective points being used in the communication of the set of data symbols and communicating, with the network entity, signal in accordance with a set of probabilities of the respective points, where the set of probabilities are adapted to characteristics of RF impairments associated with the channel that are measured by the UE.

Some examples of the method, user equipment (UEs), and non-transitory computer-readable medium described herein may further include operations, features, means, or instructions for measuring, in response to the request, the characteristics of RF impairments, where the characteristics of RF impairments include non-linear characteristics, phase noise characteristics, in-phase/quadrature imbalance characteristics, radio frequency spur characteristics, or any combination thereof.

Some examples of the method, user equipment (UEs), and non-transitory computer-readable medium described herein may further include operations, features, means, or instructions for measuring, as part of measuring the characteristics of RF impairments, the non-linear characteristics and measuring, as part of measuring the characteristics of RF impairments and after measuring the non-linear characteristics, the phase noise characteristics.

Some examples of the method, user equipment (UEs), and non-transitory computer-readable medium described herein may further include operations, features, means, or instructions for receiving, after receiving the request and prior to communicating the signaling, second signaling indicating the set of probabilities.

Some examples of the method, user equipment (UEs), and non-transitory computer-readable medium described herein may further include operations, features, means, or instructions for demodulating, based on communicating the signaling, symbols in the signaling in accordance with the set of probabilities.

Some examples of the method, user equipment (UEs), and non-transitory computer-readable medium described herein may further include operations, features, means, or instructions for determining that the request may be requesting the probabilities for the respective points and calculating, in response to the request and based on the characteristics of RF impairments, respective values for the probabilities, where the set of probabilities for the communicating may be based on the calculated respective values of the probabilities.

Some examples of the method, user equipment (UEs), and non-transitory computer-readable medium described herein may further include operations, features, means, or instructions for selecting, based on the calculated respective values of the probabilities, and from among a set of multiple sets of probabilities of the respective points, the set of probabilities and transmitting, to the network entity and based on selecting the set of probabilities, second signaling including an index of the set of probabilities.

Some examples of the method, user equipment (UEs), and non-transitory computer-readable medium described herein may further include operations, features, means, or instructions for transmitting, to the network entity and in response to the request, second signaling including the calculated respective values of the probabilities.

Some examples of the method, user equipment (UEs), and non-transitory computer-readable medium described herein may further include operations, features, means, or instructions for receiving, from the network entity, prior to communicating the signaling and based on transmitting the second signaling, an indication that the set of probabilities may be configured for subsequent communications between the UE and the network entity.

Some examples of the method, user equipment (UEs), and non-transitory computer-readable medium described herein may further include operations, features, means, or instructions for determining that the request may be requesting the characteristics of RF impairments and transmitting, to the network entity and in response to the request, second signaling that indicates the characteristics of RF impairments measured by the UE.

Some examples of the method, user equipment (UEs), and non-transitory computer-readable medium described herein may further include operations, features, means, or instructions for receiving, from the network entity, prior to communicating the signaling and based on transmitting the second signaling, third signaling that indicates the set of probabilities, where the set of probabilities may be based on values of the probabilities of the respective points calculated by the network entity using the characteristics of the RF impairments measured by the UE.

In some examples of the method, user equipment (UEs), and non-transitory computer-readable medium described herein, the third signaling includes an index of the set of probabilities, the set of probabilities being selected from among a set of multiple sets of probabilities of the respective points.

A method for wireless communication by a network entity is described. The method may include transmitting, to a UE, a request associated with probabilities of respective points of a constellation for communication of a set of data symbols over a channel between the UE and the network entity, where the probabilities indicate respective likelihoods of the respective points being used in the communication of the set of data symbols and communicating, with the UE, signaling in accordance with a set of probabilities of the respective points, where the set of probabilities of the respective points are adapted to characteristics of RF impairments associated with the channel that are measured by the UE.

A network entity for wireless communication is described. The network entity may include one or more memories storing processor executable code, and one or more processors coupled with the one or more memories. The one or more processors may individually or collectively operable to execute the code to cause the network entity to transmit, to a UE, a request associated with probabilities of respective points of a constellation for communication of a set of data symbols over a channel between the UE and the network entity, where the probabilities indicate respective likelihoods of the respective points being used in the communication of the set of data symbols and communicating, with the UE, signal in accordance with a set of probabilities of the respective points, where the set of probabilities of the respective points are adapted to characteristics of RF impairments associated with the channel that are measured by the UE.

Another network entity for wireless communication is described. The network entity may include means for transmitting, to a UE, a request associated with probabilities of respective points of a constellation for communication of a set of data symbols over a channel between the UE and the network entity, where the probabilities indicate respective likelihoods of the respective points being used in the communication of the set of data symbols and means for communicating, with the UE, signaling in accordance with a set of probabilities of the respective points, where the set of probabilities of the respective points are adapted to characteristics of RF impairments associated with the channel that are measured by the UE.

A non-transitory computer-readable medium storing code for wireless communication is described. The code may include instructions executable by a processor to transmit, to a UE, a request associated with probabilities of respective points of a constellation for communication of a set of data symbols over a channel between the UE and the network entity, where the probabilities indicate respective likelihoods of the respective points being used in the communication of the set of data symbols and communicating, with the UE, signal in accordance with a set of probabilities of the respective points, where the set of probabilities of the respective points are adapted to characteristics of RF impairments associated with the channel that are measured by the UE.

Some examples of the method, network entities, and non-transitory computer-readable medium described herein may further include operations, features, means, or instructions for determining, based on a response of the UE to the request, the set of probabilities and configuring subsequent communications between the UE and the network entity in accordance with the set of probabilities.

In some examples of the method, network entities, and non-transitory computer-readable medium described herein, configuring, prior to transmitting the request, a second set of probabilities of the respective points, the second set of probabilities being uniformly distributed, where the set of probabilities may be a first set of probabilities.

Some examples of the method, network entities, and non-transitory computer-readable medium described herein may further include operations, features, means, or instructions for transmitting, to the UE, after transmitting the request and prior to communicating the signaling, second signaling indicating the set of probabilities.

Some examples of the method, network entities, and non-transitory computer-readable medium described herein may further include operations, features, means, or instructions for selecting, from among a set of multiple sets of probabilities of the respective points, the set of probabilities, where the second signaling includes an index of the set of probabilities.

Some examples of the method, network entities, and non-transitory computer-readable medium described herein may further include operations, features, means, or instructions for requesting, in the request, for the UE to determine the probabilities for the respective points and receiving, in response to the request and prior to communicating the signaling, second signaling that indicates the set of probabilities of the respective points determined by the UE.

Some examples of the method, network entities, and non-transitory computer-readable medium described herein may further include operations, features, means, or instructions for configuring subsequent communications between the UE and the network entity based on the set of probabilities of the respective points of the constellation received in the second signaling.

Some examples of the method, network entities, and non-transitory computer-readable medium described herein may further include operations, features, means, or instructions for requesting, in the request, for the UE to report the characteristics of RF impairments and receiving, in response to the request and prior to communicating the signaling, the characteristics of RF impairments measured by the UE.

Some examples of the method, network entities, and non-transitory computer-readable medium described herein may further include operations, features, means, or instructions for calculating, based on the characteristics of RF impairments received from the UE, respective values of the probabilities.

Some examples of the method, network entities, and non-transitory computer-readable medium described herein may further include operations, features, means, or instructions for transmitting, based on calculating the respective values of the probabilities, second signaling that indicates the set of probabilities.

In some examples of the method, network entities, and non-transitory computer-readable medium described herein, the second signaling includes the set of probabilities.

Some examples of the method, network entities, and non-transitory computer-readable medium described herein may further include operations, features, means, or instructions for selecting, from among a set of multiple sets of probabilities of the respective points based on the calculated respective values of the probabilities, the set of probabilities of the respective points, where the second signaling includes an index of the set of probabilities.

DETAILED DESCRIPTION

A wireless communication system may modulate sets of data in accordance with a constellation of a configured modulation (e.g., 16-QAM). In some examples, a probability of a set of data being mapped to any one of the points of a constellation (which may be referred to as a "prior probability") may be uniform—that is, it may be just as likely for a set of data to be mapped to one point as to any other point in the constellation. In some examples, a non-uniform distribution of prior probabilities for the points in a constellation may result in improved performance relative to a uniform distribution of prior probabilities—e.g., in the presence of radio frequency (RF) impairments, such as non-linear impairments, phase noise impairments, in-phase/quadrature (IQ) imbalance impairments, RF spur impairments. In some examples, different non-uniform distributions may be preferred for different RF impairments—e.g., a first non-uniform distribution may be preferred for a first set of RF impairments, a second non-uniform distribution may be preferred for a second set of RF impairments, and so on. Mechanisms (e.g., techniques, configurations, components) that support adapting prior probabilities to changing RF impairments in a wireless communication environment are disclosed herein.

To adapt prior probabilities for communications in a wireless communication environment with changing RF impairments, a network entity may communicate, to a UE, a request associated with configuring prior probabilities of a constellation. In some examples, the request may ask the UE to calculate and report preferred prior probabilities for the RF impairments associated with the channel between network entity and the UE. The network entity may then configure subsequent communications with the reported prior probabilities. In other examples, the request may ask the UE to evaluate and report RF impairments associated with the channel between the network entity and the UE. The network entity may then use the reported RF impairments to calculate preferred prior probabilities for the RF impairments and may configure subsequent communications with the calculated prior probabilities.

Figure 1:
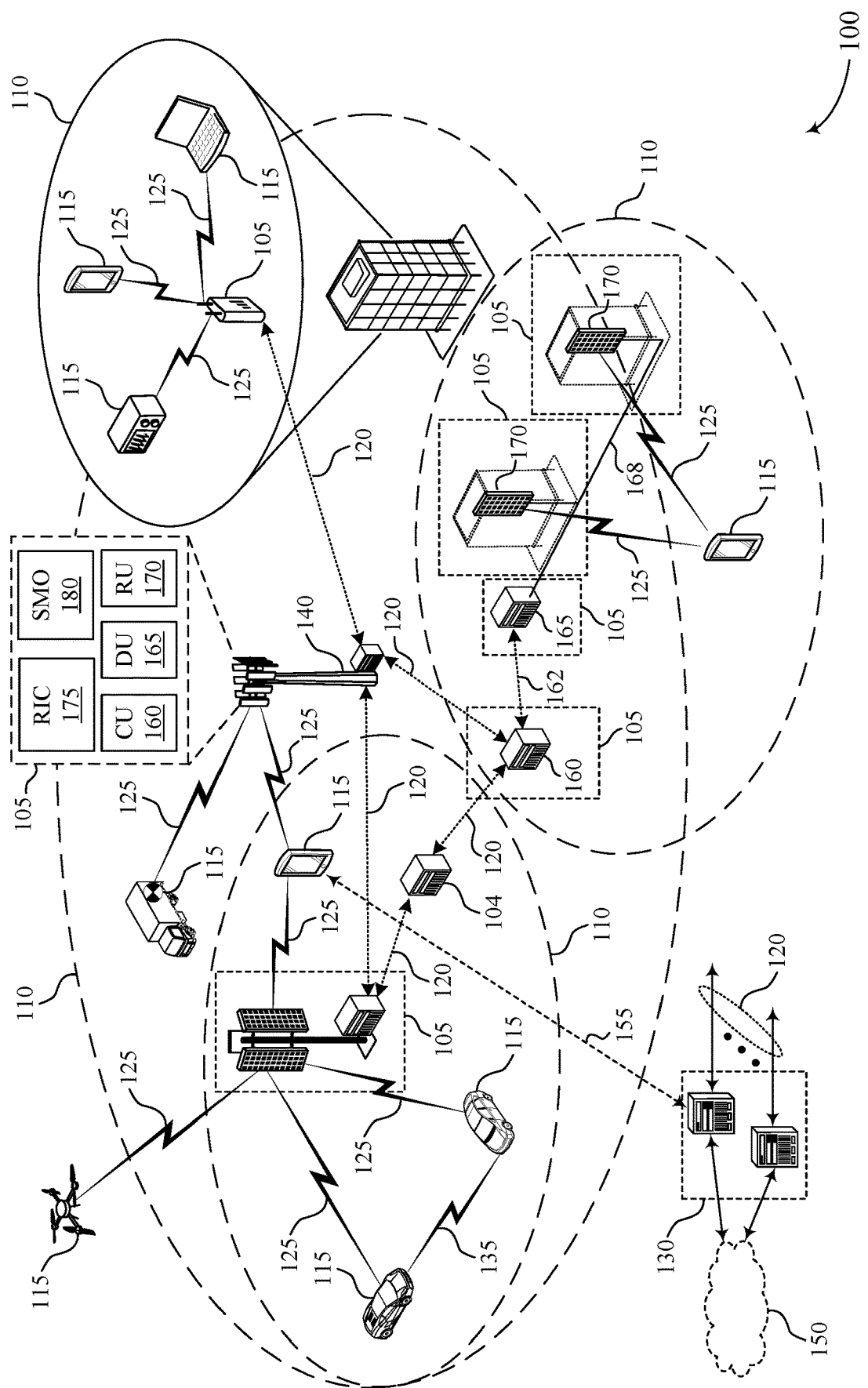
FIG. 1 shows an example of a wireless communications system that supports adaptive determination of constellation point usage probabilities in accordance with one or more aspects of the present disclosure.

FIG. 1 shows an example of a wireless communications system 100 that supports adaptive determination of constellation point usage probabilities in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support adaptive determination of constellation point usage probabilities as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Prior to being conveyed using a wireless channel, data bits may be encoded (e.g., using an encoding technique, such as Turbo encoding) into a set of encoded data bits. After encoding the data bits, modulation symbols may be generated from the encoded data bits—in accordance with a configured modulation scheme. As part of generating the modulation symbols, respective sets of the encoded data bits may be mapped to respective points in a constellation corresponding to the configured modulation scheme. A point in a constellation may correspond to a unique symbol of the configured modulation scheme. For example, for 16-QAM, respective sets of four encoded data bits may be mapped to respective points of sixteen available points in the 16-QAM constellation.

Due to the randomized nature of data, the probability of a set of encoded data bits being mapped to any one of the points may be uniform. That is, it may be just as likely that a set of encoded data bits will be mapped to any point of the available points. For example, for 16-QAM, each point may have a 6.25% chance of being mapped to by a current set of encoded data bits. The probability of a set of encoded data bits being mapped to a point may be referred to as a "prior probability" of the point.

In some examples, a non-uniform distribution of a set of prior probabilities for a constellation may perform better than a uniform distribution of a set of prior probabilities. For example, in the presence of additive white Gaussian noise (AWGN) noise, a distribution of a set of prior probabilities that is of a Gaussian shape may perform better than a uniform distribution of a set of prior probabilities.

A wireless signal may also experience RF impairments, such as non-linear RF impairments, phase noise impairments, IQ imbalance impairments, and RF spur impairments. These RF impairments may subject different points of a constellation to different levels of noise. For example, the non-linear impairments may affect outer points of a constellation more strongly than inner points of a constellation—e.g., may attenuate an amplitude of symbols transmitted using outer points more than inner points. Also, phase noise impairments may affect outer points of a constellation more strongly than inner points of a constellation—e.g., may introduce increased phase variation to symbols transmitted using outer points more than inner points.

Thus, in the presence of these RF impairments, symbols transmitted using the inner points of a constellation may be more reliable (e.g., less prone to being misinterpreted as incorrect symbols) than symbols transmitted using the outer points of the constellation. In such cases, it may be preferred to transmit more symbols using the inner points of the constellation than the outer points of the constellation—e.g., it may provide a signal-to-noise ratio (SNR) improvement for communications using the channel. That is, it may be preferred to adapt the prior probabilities of the points of the constellation so that a likelihood of a set of encoded data bits being mapped to inner constellation points is higher than a likelihood of a set of encoded data bits being mapped to outer constellation points. For different degrees of the RF impairments, the degree to which inner constellation points is preferred may change—e.g., strong effects of RF impairments on outer points may indicate higher prior probabilities for inner points. In such cases, despite reducing (e.g., significantly) a usage of the outer points of the constellation, it may remain beneficial to maintain the larger constellation (rather than switching to a lower order constellation) for wireless communication—e.g., for data throughput reasons.

To adapt the prior probabilities of the points of a constellation, particular encoding techniques may be used that result in sets of encoded data bits being mapped to points of the constellation in accordance with the adapted set of prior probabilities. In a changing environment (e.g., due to objects moving into and out of the environment, due to movement of a communication device itself, etc.), the RF impairments associated with a channel may change often. Accordingly, the prior probabilities that result in preferred communication characteristics (e.g., higher SNR) may also change often.

For example, a first set of prior probabilities may be preferred when a UE is in a first location serviced by a network entity and a second set of prior probabilities may be preferred when a UE is in a second location serviced by the network entity.

However, mechanisms for monitoring the changing RF impairments and adapting prior probabilities to changing RF impairments may not be implemented in wireless communication systems. Thus, mechanisms (e.g., techniques, configurations, components) that support adapting prior probabilities to changing RF impairments in a wireless communication environment may be desired.

To adapt prior probabilities for communications in a wireless communication environment with changing RF impairments, a network entity may communicate, to a UE, a request associated with configuring prior probabilities of a constellation. In some examples, the request may ask the UE to calculate and report preferred prior probabilities for the RF impairments associated with the channel between network entity and the UE. The network entity may then configure subsequent communications with the reported prior probabilities. In other examples, the request may ask the UE to evaluate and report RF impairments associated with the channel between the network entity and the UE. The network entity may then use the reported RF impairments to calculate preferred prior probabilities for the RF impairments and may configure subsequent communications with the calculated prior probabilities.

In some examples, a network entity 105 may transmit a request associated with configuring probabilities of respective points of a constellation for communication of a set of data symbols using a channel between the network entity 105 and a UE 115. The probabilities may indicate respective likelihoods of the respective points being used in the communication of the set of data symbols and may be referred to as prior probabilities. In some examples, the request may ask the UE 115 to calculate and report preferred prior probabilities based on RF impairments measured by the UE 115. In other examples, the request may ask the UE to report RF impairments observed by the UE 115; in which case, the network entity 105 may calculate preferred prior probabilities based on the reported RF impairments.

Based on the preferred prior probabilities determined at the network entity 105 (e.g., those reported by the UE 115, those calculated by the network entity 105), the network entity 105 may configure subsequent communications in accordance with the prior probabilities. In an example where the network entity 105 determines the prior probabilities based on those reported by the UE 115, the network entity 105 may indicate to the UE 115 that the prior probabilities reported by the UE 115 are configured for subsequent communications. In an example where the network entity 105 calculates the prior probabilities based on the RF impairments reported by the UE 115, the network entity 105 may indicate to the UE 115 that the calculated prior probabilities are configured for subsequent communications.

After the configured prior probabilities are indicated, the network entity 105 and the UE 115 may communicate subsequent communications in accordance with the configured prior probabilities. The network entity 105 may encode data in accordance with the prior probabilities. The UE 115 may decode data in accordance with the prior probabilities. In some examples, decoding the data in accordance with the prior probabilities may include adapting log likelihood ratios.

By supporting signaling associated with configuring prior probabilities, communications between the network entity and the UE may support the dynamic configuration of non-uniform prior probabilities adapted to changing RF impairments. Accordingly, characteristics (e.g., SNR) of the communications between the network entity and the UE may be improved in the presence of changing RF impairments, while maintaining throughput characteristics.

Figure 2:
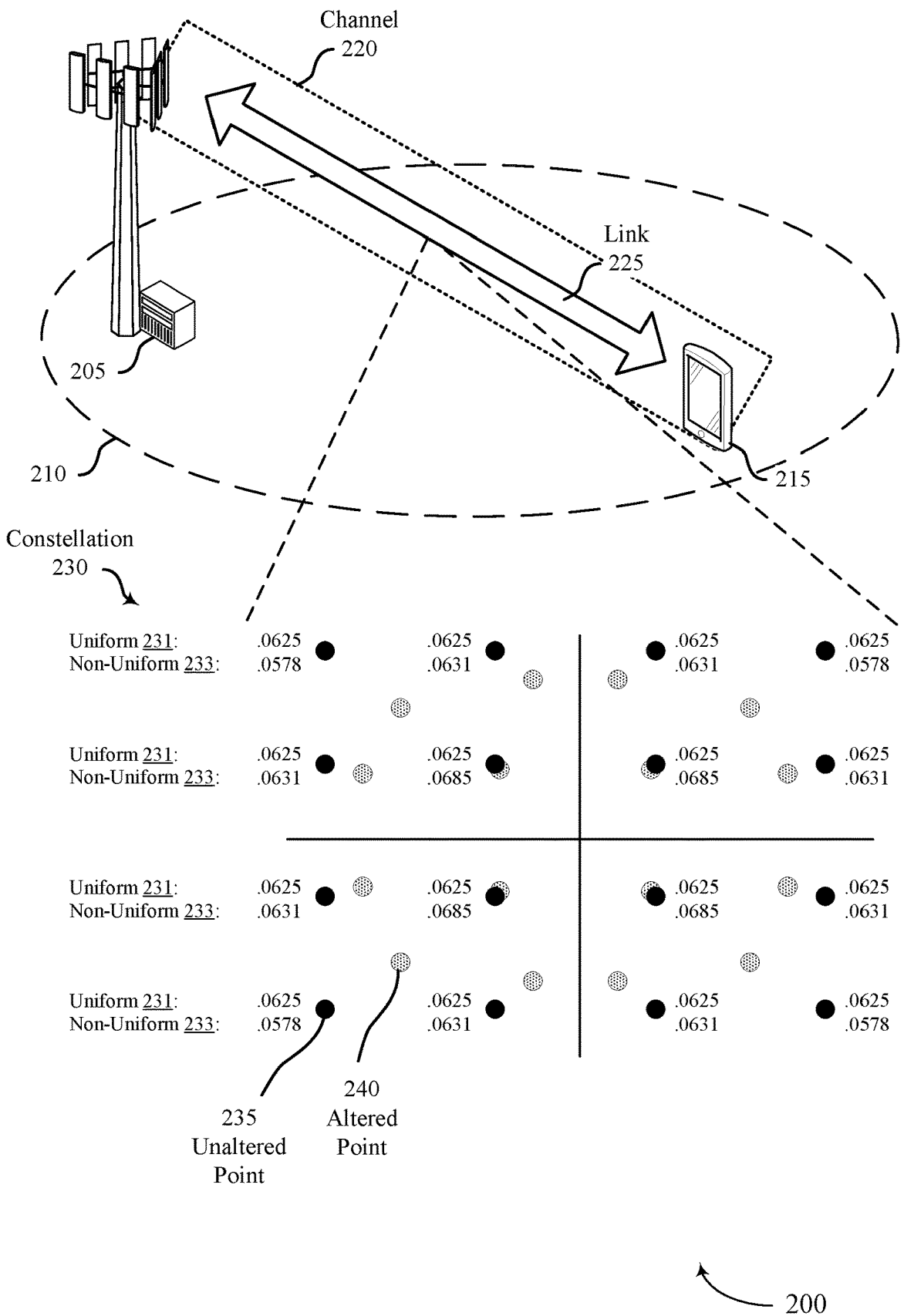
FIG. 2 shows an example of a wireless communications subsystem that supports adaptive determination of constellation point usage probabilities in accordance with one or more aspects of the present disclosure.

FIG. 2 shows an example of wireless communications subsystem that supports adaptive determination of constellation point usage probabilities in accordance with one or more aspects of the present disclosure.

The wireless communications subsystem 200 may include a network entity 205 and a UE 215, which may be respective examples of a network entity (e.g., a network entity 105 of FIG. 1) and a UE (e.g., a UE 115 of FIG. 1) described herein. The network entity 205 and the UE 215 may communicate with one another within coverage area 210 using one or more of the techniques described herein, and the coverage area 210 may be an example of a coverage area (e.g., a coverage area 110 of FIG. 1) described herein.

The network entity 205 may communicate with the UE 215 using the link 225. The link 225 may support the communication of both uplink and downlink communications between the network entity 205 and the UE 215. In some examples, the wireless resources positioned between the network entity 205 and the UE 215 may be referred to as a channel 220 between the network entity 205 and the UE 215, and the communications between the network entity 205 and the UE 215 may be performed using the channel 220. Characteristics (e.g., SNR, interference, path loss, blockage, Doppler shift) of the channel 220 may affect a performance (e.g., a bit error rate, a throughput, etc.) of communications using the channel 220. RF impairments (e.g., non-linearity, phase noise, IQ imbalance, RF spurs, etc.) may also affect a performance of communications using the channel 220.

The network entity 205 and the UE 215 may communicate with one another in accordance with a modulation and coding scheme. For example, the network entity 205 and the UE 215 may use a modulation (e.g., 16-QAM, 16-APSK, etc.) that is determined as providing a highest throughput while being suited to the channel 220 (e.g., while exhibiting an error rate that is less than a threshold error rate). The network entity 205 and the UE 215 may also use a coding (e.g., Turbo coding) that improves a performance (e.g., reduces an error rate) of communications using the channel 220 (e.g., by introducing redundancy).

In such cases, the network entity 205 and the UE 215 may communicate in accordance with the constellation 230 that corresponds to the configured modulation—e.g., the constellation 230 may correspond to 16-QAM. As depicted in FIG. 2, the constellation 230 may include sixteen (16) unaltered points (that are depicted as black circles and include the unaltered point 235) that are each associated with unique combinations of magnitude and phase. The sixteen points may be uniformly distributed across the constellation 230—e.g., to enable the points to be distinguished from one another.

The points of the constellation 230 may further correspond to symbols communicated using the channel 220—e.g., the constellation 230 may be used to generate sixteen (16) unique symbols, each having a unique combination of magnitude and phase and each conveying a unique binary value (e.g., one of 0000, 0001 . . . 1111). Prior to generating the symbols, a transmitting device may first map a stream of encoded data bits to the points of the constellation 230. For example, in an encoded data stream (e.g., 0101|0010|0100|1011|1001|0100), sets of four data bits may be mapped to corresponding points of the constellation 230. In some examples, the encoded data stream is generated as a result of encoding an unencoded data stream.

As a result of the randomness of data and the selected encoding scheme, a probability that any one set of data bits in an encoded data stream will be mapped to any one of the points in the constellation 230 may be the same. That is, the probabilities (which may also be referred to as the prior probabilities of the points) indicating whether an upcoming set of data bits in the encoded data stream will be mapped to the points of the constellation 230 may be uniformly distributed across the points of the constellation 230—each point may have a 6.25% chance of being mapped to by the upcoming set of data bits. Thus, over time, each point in the constellation 230 may be used roughly a same amount to support communications between the network entity 205 and the UE 215. The uniform prior probabilities 231 for the unaltered points of the constellation 230 are given in the top line of text depicted in FIG. 2.

In some examples, the RF impairments may affect the constellation 230 such that the altered points (e.g., the altered point 240) of the constellation 230 (e.g., the points of the constellation 230 are offset from the unaltered points of the constellation 230). For example, though the network entity 205 may generate symbols in accordance with the unaltered points of the constellation 230, the symbols received at the UE 215 may be received in accordance with the altered points of the constellation 230. In some examples, the RF impairments may affect the outer points of the constellation 230 more strongly than the inner points of the constellation 230.

As discussed above, the prior probabilities of the points may be uniformly distributed across the constellation 230, and sets of data bits may be equally apportioned across the points of the constellation 230. However, since the RF impairments affect the points of the constellation 230 in a non-uniform way, it may be preferred (e.g., may increase an SNR for communications) to increase the prior probabilities for the inner points of the constellation 230 and to reduce the prior probabilities for the outer points of the constellation 230—e.g., such that the likelihood of using an inner point is higher than a likelihood of using an outer point. In such cases, an encoding scheme that results in a non-uniform distribution of prior probabilities across the points of the constellation 230 may be used to increase a performance (e.g., SNR) of communications between the network entity 205 and the UE 215. FIG. 2 depicts uniform prior probabilities of the points of the constellation 230 as well as non-uniform prior probabilities of the points of the constellation 230. The non-uniform prior probabilities increase a likelihood of using inner points of the constellation 230 for symbol transmission and may improve a performance of communications using the constellation 230. The non-uniform prior probabilities 233 for the unaltered points of the constellation 230 are given in the bottom line of text depicted in FIG. 2.

Like characteristics of the channel 220, RF impairments experienced by the network entity 205 and the UE 215 may change over time—e.g., as the UE 215 moves about the coverage area 210. Accordingly, the effect of RF impairments on the constellation 230 may change over time, and the non-uniform prior probabilities used to improve a performance of communications between the network entity 205 and UE 215 for a first set of RF impairments may be less effective for a second set of RF impairments. Accordingly, the network entity 205 and the UE 215 may use techniques for adapting the prior probabilities to a changing sets of RF impairments affecting communications between the network entity 205 and the UE 215.

Figure 3:
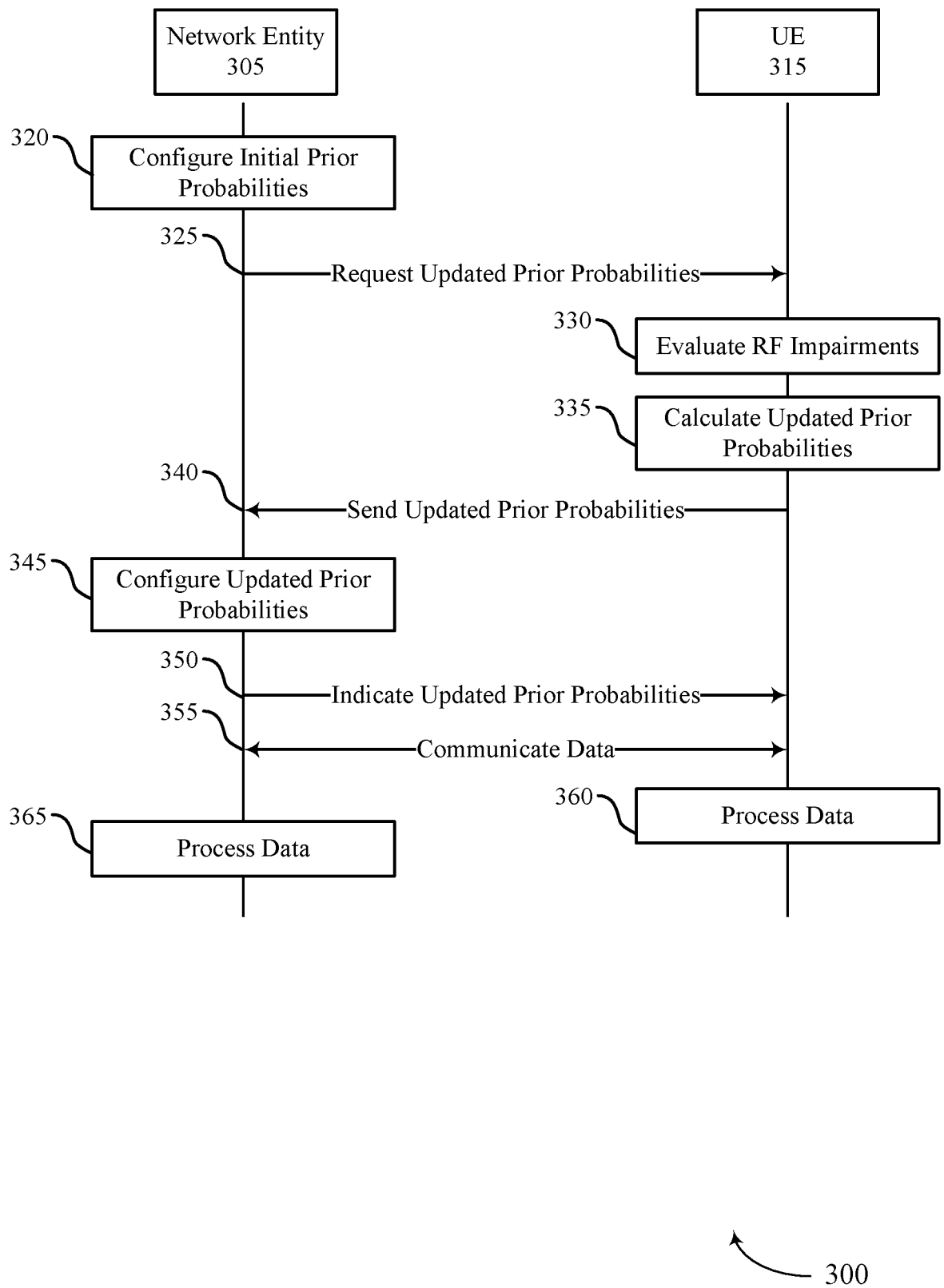
FIG. 3 shows an example of a set of operations for adaptive determination of constellation point usage probabilities in accordance with one or more aspects of the present disclosure.

In some examples, the network entity 205 may configure a set of prior probabilities by requesting the UE 215 to calculate prior probabilities based on RF impairments observed at the UE 215, as described in more detail herein including with reference to FIG. 3.

Figure 4:
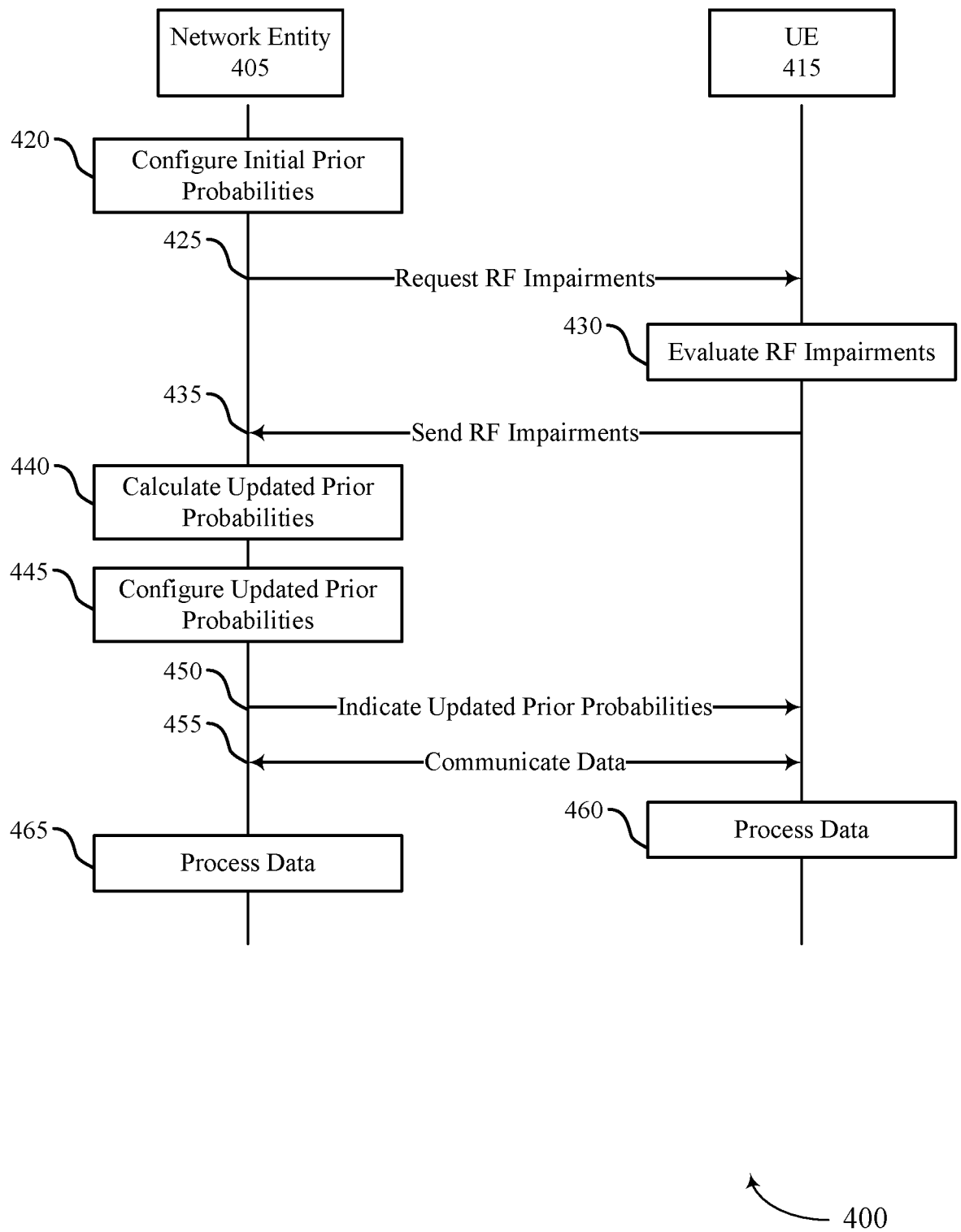
FIG. 4 shows an example of a set of operations for adaptive determination of constellation point usage probabilities in accordance with one or more aspects of the present disclosure.

In some examples, the network entity 205 may configure a set of prior probabilities based on calculating the prior probabilities in accordance with RF impairments observed at the UE 215 that are reported to the network entity 205 in response to a request from the network entity 205, as described in more detail herein including with reference to FIG. 4.

FIG. 3 shows an example of a set of operations for adaptive determination of constellation point usage probabilities in accordance with one or more aspects of the present disclosure.

The process flow 300 may be performed by the network entity 305 and the UE 315, which may be respective examples of a network entity (e.g., a network entity 105 of FIG. 1, the network entity 205 of FIG. 2) and a UE (e.g., a UE 115 of FIG. 1, the UE 215 of FIG. 2) described herein. In some examples, the process flow 300 illustrates an example set of operations performed to support adaptive determination of constellation point usage probabilities. For example, the process flow 300 may include operations for a network entity to obtain updated prior probabilities from a UE and to configure the updated prior probabilities for subsequent communications.

At 320, the network entity 305 may configure initial prior probabilities for communications with the UE 315. For example, the network entity 305 may configure uniform prior probabilities for a constellation of a modulation (e.g., M-ary QAM, M-ary APSK, etc.) configured for communications between the network entity 305 and the UE 315.

At 325, the network entity 305 may request the UE 315 to determine and report preferred, non-uniform prior probabilities for communications between the network entity 305 and the UE 315. In some examples, the request may include an indicator that indicates that the UE 315 is to calculate the preferred prior probabilities at the UE 315. The network entity 305 may send such requests multiple times in a duration (e.g., periodically). In some examples, a frequency with which such requests are sent may be based on a determined variation of the RF impairments, of SNR, a metric of the system (e.g., control resources, system bandwidth, connected devices), a capability of the system, or any combination thereof. The network entity 305 may send the request over control channel (e.g., PDCCH) resources—e.g., in a downlink control information (DCI) message.

At 330, the UE 315 may evaluate RF impairments affecting communications between the network entity 305 and the UE 315. The RF impairments may include non-linearity impairments, phase noise impairments, IQ imbalance impairments, and RF spur impairments. In some examples, evaluating the RF impairments may include determining an impact of one or more of the RF impairments on the constellation. In some examples, when communications are impaired by both non-linear impairments and phase noise impairments, the UE 315 may be configured to first determine the impact of the non-linear impairments on the constellation. And then to determine the impact of the phase noise impairments on the constellation.

To determine the impact of non-linear impairments, the UE 315 may be configured to run a K-means procedure on one or more observed signals to identify the altered points of the constellation in the face of the non-linear impairments. To determine the impact of phase noise impairments, the UE 315 may be configured to run a standard deviation calculation for the phase error of each point of the constellation on one or more observed signals to identify the altered points of the constellation in the face of the phase noise impairments.

At 335, the UE 315 may calculate updated prior probabilities for communications with the network entity 305 in response to the request and based on the evaluated RF impairments. The UE 315 may calculate updated prior probabilities that improve a performance (e.g., SNR) of communications between the network entity 305 and the UE 315 in light of the evaluated RF impairments. In some examples, the UE 315 may calculate updated prior probabilities that improve (e.g., maximize) a capacity of the channel between the network entity 305 and the UE. The UE 315 may determine updated prior probabilities that improve the capacity of the channel by solving the following mutual information expression:

$$\arg\max_{p(x)}(\text{Capacity}) = \arg\max_{p(x)} I(x, y)$$
$$= \arg\max_{p(x)} E\left\{\log\left(\frac{p(x, y)}{p(x)p(y)}\right)\right\}$$
$$= \arg\max_{p(x)} \int_y \sum_x p(x, y)\log\left(\frac{p(x, y)}{p(y)p(y)}\right),$$

where x is the transmission signal and y is the received signal. The samples of x may belong to a finite, deterministic, impaired set of points of a constellation (e.g., 16-QAM). The samples of y may be noisy points which have the expectation of the corresponding (impaired) constellation point and variance which corresponds to the RF impairment. For example, in the presence of both non-linear and phase noise impairments, the expectation may be of a constellation that is similar to the altered constellation depicted in FIG. 2 (with the outer constellation points being pulled toward a center point), where the standard deviation may be based on thermal noise and phase noise.

In some examples, to determine the updated prior probabilities, the UE 315 may be configured to solve the mutual information expression. Since the mutual information expression is non-linear, the UE 315 may use nonlinear optimization tools (e.g., a MATLAB function such as fmincon) to find prior probabilities for each point in a constellation that yield a preferred result for (e.g., optimize) the mutual information expression.

In other examples, to determine the updated prior probabilities, the UE 315 may select from sets of predetermined prior probabilities. In such cases, the UE 315 may select the prior probability set that causes the mutual information expression to yield the highest capacity. In some examples, to distinguish between prior probability sets that yield similar capacities, the UE 315 may select the prior probability set that simplifies an implementation of a non-uniform coding scheme.

At 340, the UE 315 may send an indication of the updated prior probabilities to the network entity 305. In some examples, the UE 315 may signal the calculated prior probabilities for each point in the constellation to the network entity 305.

In other examples, the UE 315 may signal an indication of a set of prior probabilities that correspond to the calculated prior probabilities to the network entity 305. For example, the UE 315 may consult a table of prior probability sets for a modulation and may select an entry (and a prior probability set) in the table that most closely matches the calculated set of prior probabilities. The UE 315 may then signal an index of the entry to the network entity 305. In some examples, the prior probability sets in the table of prior probability sets corresponds to the prior probability sets used to solve the mutual information expression.

At 345, the network entity 305 may configure the updated prior probabilities indicated by the UE 315 for subsequent communications (using subsequent slots) with the UE 315.

In some examples, rather than using the updated prior probabilities, the network entity 305 may configure a set of updated prior probabilities that is based on the updated prior probabilities indicated by the UE 315. For example, the network entity 305 may select, from multiple prior probability sets, a prior probability set that most closely matches the updated prior probabilities indicated by the UE 315. Additionally, or alternatively, the network entity 305 may modify one or more of the prior probabilities indicated by the UE 315—e.g., based on information of RF impairments at the network entity 305. Additionally, or alternatively, the network entity 305 may select a prior probability set that is different than (but similar to) a prior probability set indicated by the UE 315—e.g., based on information of RF impairments at the network entity 305.

Based on configuring the updated, non-uniform prior probabilities for subsequent communications, the network entity 305 may configure an encoding scheme for encoding subsequent sets of data received at the network entity 305 for transmission to the UE 315 in accordance with the configured, non-uniform prior probabilities. The encoding scheme may be referred to as a non-uniform encoding scheme.

At 350, the network entity 305 may send an indication to the UE 315 that the updated prior probabilities indicated by the UE 315 have been configured for communications using subsequent slots.

In an example where the network entity 305 configures prior probabilities that are based on (though different than) the prior probabilities indicated by the UE 315, the network entity 305 may indicate the configured prior probabilities to the UE 315—e.g., by indicating a prior probability for each point of a constellation, by indicating a corresponding prior probability set, etc.

At 355, the network entity 305 may communicate with the UE 315 in accordance with the configured prior probabilities. In some examples, the network entity 305 may use the configured prior probabilities for transmissions to the UE 315, and the UE 315 may use the configured prior probabilities for transmissions to the network entity 305.

As part of communicating with the UE 315, the network entity 305 may apply a non-uniform encoding to sets of data that are received for the UE 315. Based on applying the non-uniform encoding, the network entity 305 may map the encoded sets of data to the points of the constellation, where the encoded sets of data may be non-uniformly mapped to the points of the constellation. That is, the encoded sets of data may be mapped to particular (e.g., inner) points more often than to other (e.g., outer) points. Similarly, the UE 315 may apply a non-uniform encoding to sets of data generated at the UE 315 for transmission to the network entity 305.

At 360, the UE 315 may process data received from the network entity 305 in accordance with the configured prior probabilities. Processing the data may include demodulating symbols in signals received from the network entity 305 to obtain an encoded data stream. In some examples, the UE 315 may modify the log-likelihood ratios used for demodulation (relative to the log-likelihood ratios configured when uniform prior probabilities are used) in accordance with the configured prior probabilities. In some examples, the modified log-likelihood ratios adapt to the fact that particular points are more likely to be used than other points. Processing the data may further include decoding the encoded data stream to obtain the underlying data.

At 365, the network entity 305 may process data received from the UE 315 in accordance with the configured prior probabilities. The network entity 305 may similarly demodulate symbols in signals received from the UE 315 using modified log-likelihood ratios and may decode the encoded data stream that results from demodulating the signal.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

FIG. 4 shows an example of a set of operations for that supports adaptive determination of constellation point usage probabilities in accordance with one or more aspects of the present disclosure.

The process flow 400 may be performed by the network entity 405 and the UE 415, which may be respective examples of a network entity (e.g., a network entity 105 of FIG. 1, the network entity 205 of FIG. 2, the network entity 305 of FIG. 3) and a UE (e.g., a UE 115 of FIG. 1, the UE 215 of FIG. 2, the UE 315 of FIG. 3) described herein. In some examples, the process flow 400 illustrates an example set of operations performed to support adaptive determination of constellation point usage probabilities. For example, the process flow 400 may include operations for a network entity to obtain RF impairments from a UE for calculating updated prior probabilities and to configure the updated prior probabilities for subsequent communications.

At 420, the network entity 405 may configure initial prior probabilities as similarly described herein, including with reference to the operations described at 320 of FIG. 3.

At 425, the network entity 405 may send a request to the UE 415 to measure and report RF impairments observed by the UE 415. The network entity 405 may send such requests multiple times in a duration (e.g., periodically). In some examples, a frequency with which such requests are sent may be based on a determined variation of the RF impairments, of SNR, a need of the system, a capability of the system, or any combination thereof. The network entity 405 may send the request over control channel (e.g., PDCCH) resources—e.g., in a DCI message.

At 430, the UE 415 may evaluate RF impairments affecting communications between the network entity 405 and the UE 415 as similarly described herein, including with reference to the operations described at 330 of FIG. 3.

At 435, the UE 415 may send an indication of the evaluated RF impairments to the network entity 405. In some examples, the UE 415 may send an indication of the values of one or more of the RF impairments observed by the UE 415. For example, the UE 415 may send a value measured for a non-linear impairment, a value measured for a phase noise impairment, a value measured for an IQ imbalance impairment, a value measured for a RF spur impairment, or any combination thereof. In some examples, instead of sending the measured values measured for the RF impairments, the UE 415 may select a value from a set of discretized values for one or more of the RF impairments and send an index indicating the value selected for one or more of the RF impairments. In some examples, instead of sending the measured values or discretized values of the measured RF impairments, the UE 415 may select, from sets of discretized values of the RF impairments, a set corresponding to a combination of discretized values of the RF impairment that closely matches the measured values of the RF impairment and send an index indicating the selected set of RF values.

At 440, the network entity 405 may calculate updated prior probabilities based on the RF impairments received from the UE 415. The network entity 405 may calculate the updated prior probabilities as similarly described herein, including with reference to the operations described at 335 of FIG. 3.

At 445, the network entity 405 may configure the updated prior probabilities calculated by the network entity 405 for subsequent communications as similarly described herein, including with reference to the operations described at 345 of FIG. 3.

At 450, the network entity 405 may send an indication to the UE 415 of the configured prior probabilities as similarly described herein, including with reference to the operations described at 340 of FIG. 3.

At 455, the network entity 405 may communicate with the UE 415 in accordance with the configured prior probabilities as similarly described herein, including with reference to the operations described at 355 of FIG. 3.

At 460, the UE 415 may process data received from the network entity 405 accordance with the configured prior probabilities as similarly described herein, including with reference to the operations described at 360 of FIG. 3.

At 465, the network entity 405 may process data received from the UE 415 in accordance with the configured prior probabilities as similarly described herein, including with reference to the operations described at 365 of FIG. 3.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

Figure 5:
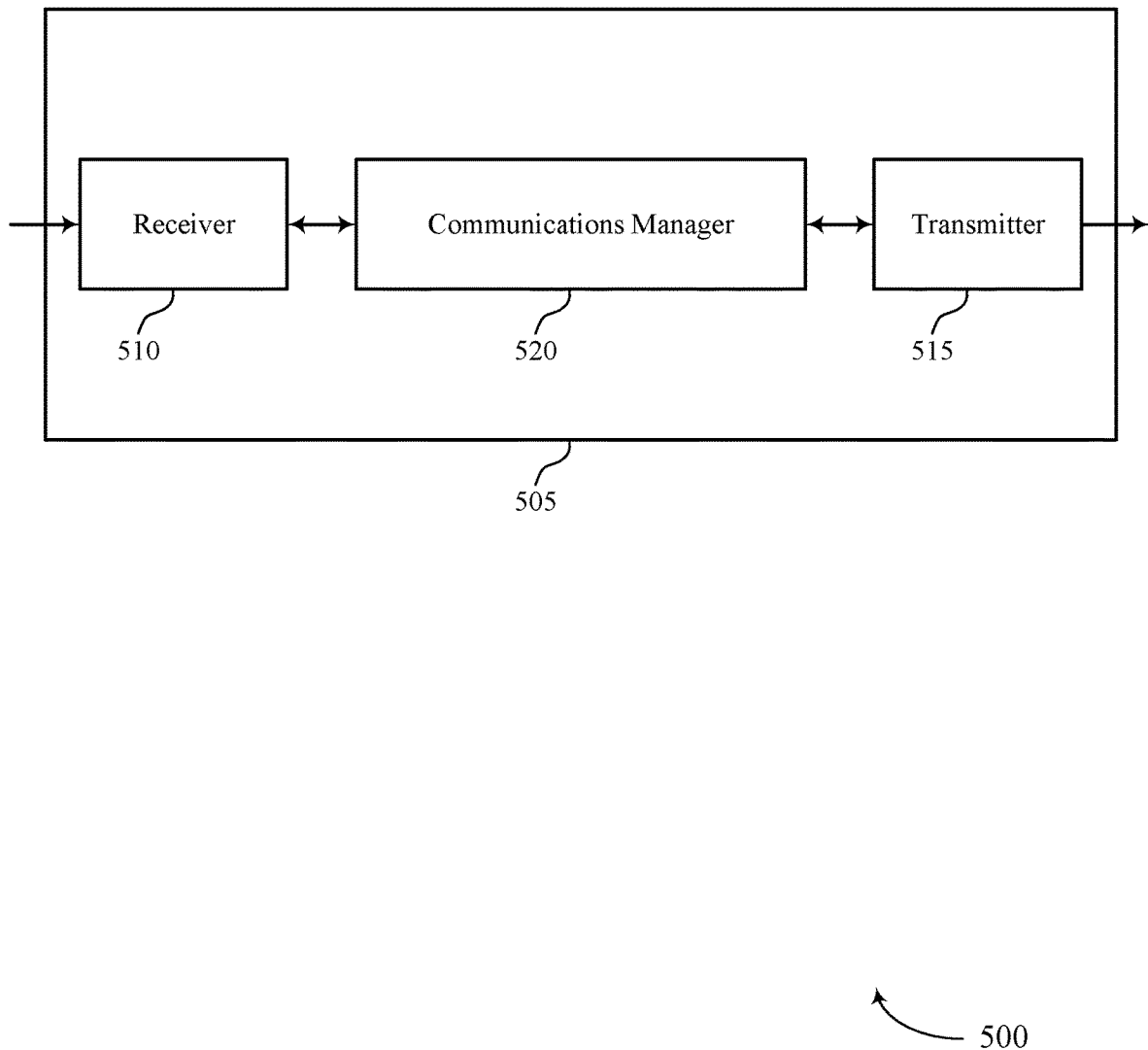
FIGS. 5 and 6 show block diagrams of devices that support adaptive determination of constellation point usage probabilities in accordance with one or more aspects of the present disclosure.

FIG. 5 shows a block diagram 500 of a device 505 that supports adaptive determination of constellation point usage probabilities in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to adaptive determination of constellation point usage probabilities). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to adaptive determination of constellation point usage probabilities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of adaptive determination of constellation point usage probabilities as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving, from a network entity, a request associated with probabilities of respective points of a constellation for communication of a set of data symbols over a channel between the UE and the network entity, where the probabilities indicate respective likelihoods of the respective points being used in the communication of the set of data symbols. The communications manager 520 is capable of, configured to, or operable to support a means for communicating, with the network entity, signaling in accordance with a set of probabilities of the respective points, where the set of probabilities are adapted to characteristics of RF impairments associated with the channel that are measured by the UE.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for adapting non-uniform prior probabilities to changing RF impairments, changing channel characteristics, or both, to improve a performance (e.g., SNR) of communications using a channel while maintaining throughput.

Figure 6:
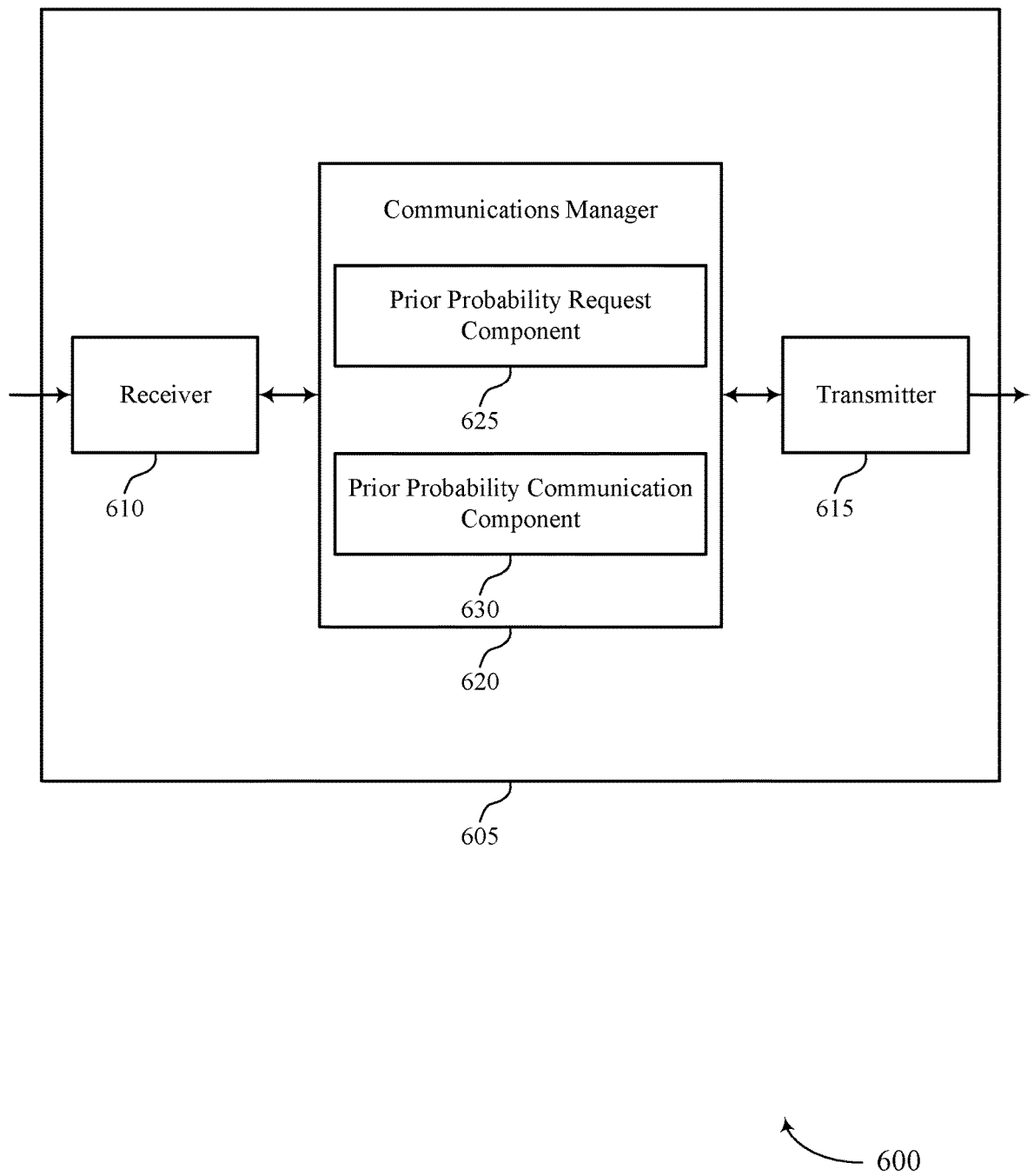

FIG. 6 shows a block diagram 600 of a device 605 that supports adaptive determination of constellation point usage probabilities in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptive determination of constellation point usage probabilities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptive determination of constellation point usage probabilities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of adaptive determination of constellation point usage probabilities as described herein. For example, the communications manager 620 may include a prior probability request component 625 a prior probability communication component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The prior probability request component 625 is capable of, configured to, or operable to support a means for receiving, from a network entity, a request associated with probabilities of respective points of a constellation for communication of a set of data symbols over a channel between the UE and the network entity, where the probabilities indicate respective likelihoods of the respective points being used in the communication of the set of data symbols. The prior probability communication component 630 is capable of, configured to, or operable to support a means for communicating, with the network entity, signaling in accordance with a set of probabilities of the respective points, where the set of probabilities are adapted to characteristics of RF impairments associated with the channel that are measured by the UE.

Figure 7:
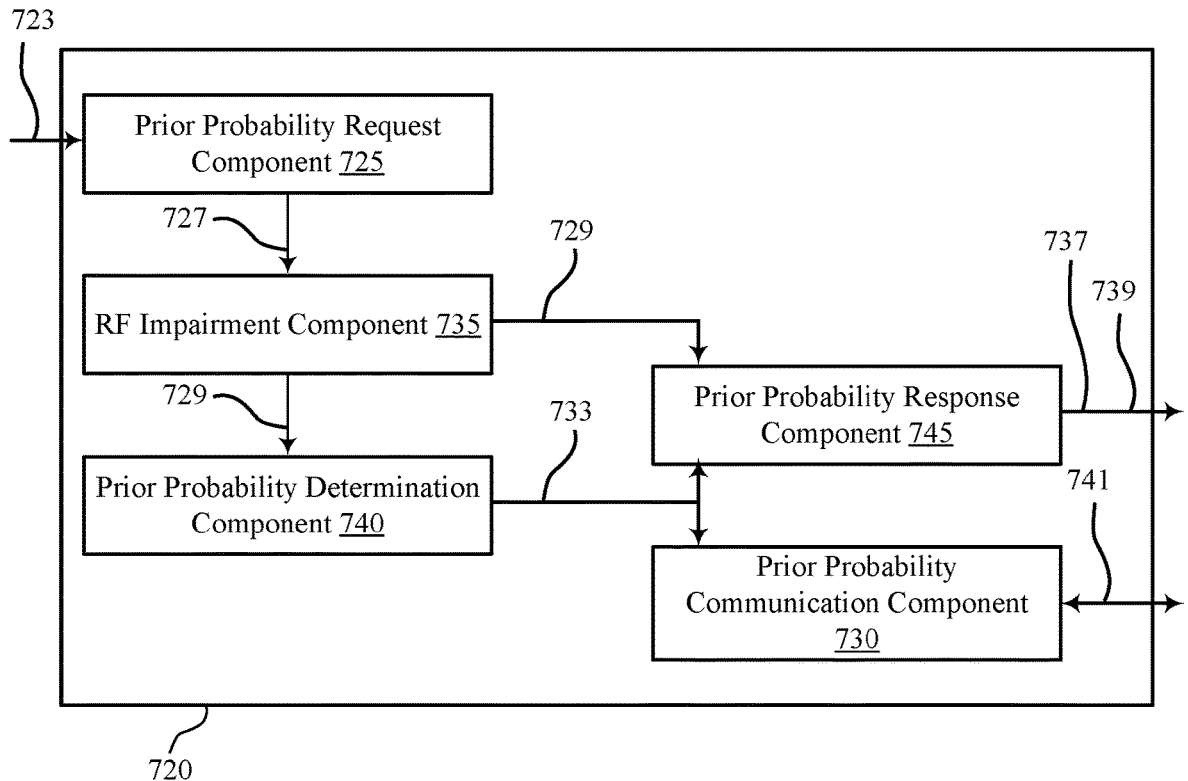
FIG. 7 shows a block diagram of a communications manager that supports adaptive determination of constellation point usage probabilities in accordance with one or more aspects of the present disclosure.

FIG. 7 shows a block diagram 700 of a communications manager 720 that supports adaptive determination of constellation point usage probabilities in accordance with one or more aspects of the present disclosure. The communications manager 720 may be an example of aspects of a communications manager 520, a communications manager 620, or both, as described herein. The communications manager 720, or various components thereof, may be an example of means for performing various aspects of adaptive determination of constellation point usage probabilities as described herein. For example, the communications manager 720 may include a prior probability request component 725, a prior probability communication component 730, an RF impairment component 735, a prior probability determination component 740, a prior probability response component 745, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The prior probability request component 725 is capable of, configured to, or operable to support a means for receiving, from a network entity, a request (e.g., the request 723) associated with probabilities of respective points of a constellation for communication of a set of data symbols over a channel between the UE and the network entity, where the probabilities indicate respective likelihoods of the respective points being used in the communication of the set of data symbols. In some examples, the communications manager 720 is capable of, configured to, or operable to support a means for sending the trigger 727 to the RF impairment component 735 to trigger the measurement of RF impairments.

The prior probability communication component 730 is capable of, configured to, or operable to support a means for communicating, with the network entity, signaling (e.g., data signaling 741) in accordance with a set of probabilities of the respective points, where the set of probabilities are adapted to characteristics of RF impairments associated with the channel that are measured by the UE.

In some examples, the RF impairment component 735 is capable of, configured to, or operable to support a means for measuring, in response to the request, the characteristics of RF impairments, where the characteristics of RF impairments include non-linear characteristics, phase noise characteristics, in-phase/quadrature imbalance characteristics, radio frequency spur characteristics, or any combination thereof.

In some examples, the RF impairment component 735 is capable of, configured to, or operable to support a means for measuring, as part of measuring the characteristics of RF impairments, the non-linear characteristics. In some examples, the RF impairment component 735 is capable of, configured to, or operable to support a means for measuring, as part of measuring the characteristics of RF impairments and after measuring the non-linear characteristics, the phase noise characteristics. In some examples, the RF impairment component 735 is capable of, configured to, or operable to support a means for sending the measured RF impairments 729 to the prior probability determination component 740. In some examples, the RF impairment component 735 is capable of, configured to, or operable to support a means for sending the measured RF impairments 729 to the prior probability response component 745.

In some examples, the prior probability communication component 730 is capable of, configured to, or operable to support a means for receiving, after receiving the request and prior to communicating the signaling, second signaling indicating the set of probabilities.

In some examples, the prior probability communication component 730 is capable of, configured to, or operable to support a means for demodulating, based on communicating the signaling, symbols in the signaling in accordance with the set of probabilities.

In some examples, the prior probability request component 725 is capable of, configured to, or operable to support a means for determining that the request is requesting the probabilities for the respective points. In some examples, the prior probability determination component 740 is capable of, configured to, or operable to support a means for calculating, in response to the request and based on the characteristics of RF impairments, respective values for the probabilities, where the set of probabilities for the communicating are based on the calculated respective values of the probabilities.

In some examples, the prior probability determination component 740 is capable of, configured to, or operable to support a means for selecting, based on the calculated respective values of the probabilities, and from among a set of multiple sets of probabilities of the respective points, the set of probabilities. In some example, the prior probability determination component 740 is capable of, configured to, or operable to support a means for sending the determined prior probabilities 733 to the prior probability response component 745 and to the prior probability communication component 730.

In some examples, the prior probability response component 745 is capable of, configured to, or operable to support a means for transmitting, to the network entity and based on selecting the set of probabilities, second signaling including an index of the set of probabilities.

In some examples, the prior probability response component 745 is capable of, configured to, or operable to support a means for transmitting, to the network entity and in response to the request, second signaling including the calculated respective values of the probabilities. In some examples, the prior probability response component 745 is capable of, configured to, or operable to support a means for sending the prior probability indication 739 to the network entity.

In some examples, the prior probability communication component 730 is capable of, configured to, or operable to support a means for receiving, from the network entity, prior to communicating the signaling and based on transmitting the second signaling, an indication that the set of probabilities is configured for subsequent communications between the UE and the network entity.

In some examples, the prior probability request component 725 is capable of, configured to, or operable to support a means for determining that the request is requesting the characteristics of RF impairments. In some examples, the prior probability response component 745 is capable of, configured to, or operable to support a means for transmitting, to the network entity and in response to the request, second signaling that indicates the characteristics of RF impairments 737 measured by the UE.

In some examples, the prior probability communication component 730 is capable of, configured to, or operable to support a means for receiving, from the network entity, prior to communicating the signaling and based on transmitting the second signaling, third signaling that indicates the set of probabilities, where the set of probabilities is based on values of the probabilities of the respective points calculated by the network entity using the characteristics of the RF impairments measured by the UE.

In some examples, the third signaling includes an index of the set of probabilities, the set of probabilities being selected from among a set of multiple sets of probabilities of the respective points.

Figure 8:
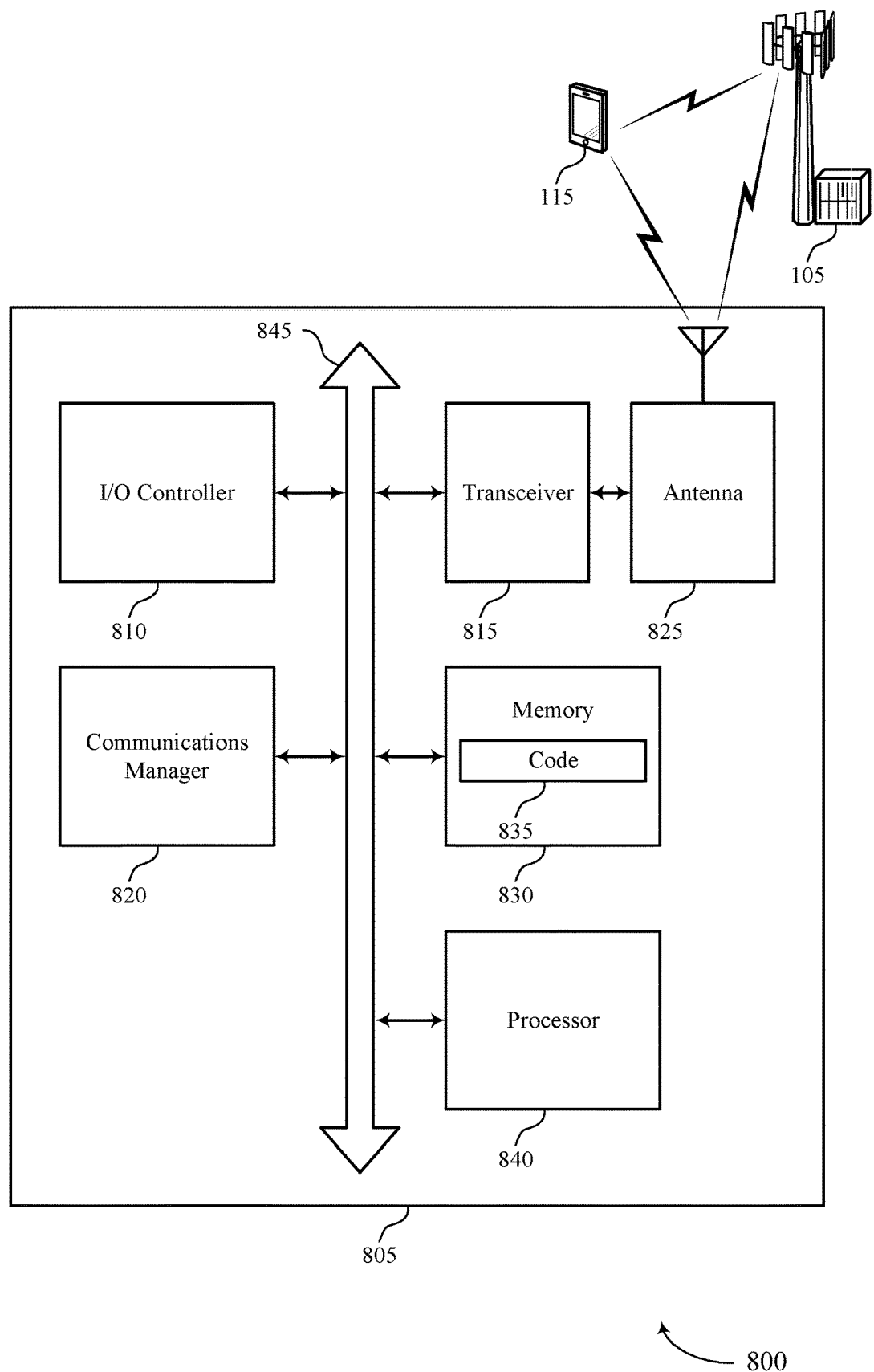
FIG. 8 shows a diagram of a system including a device that supports adaptive determination of constellation point usage probabilities in accordance with one or more aspects of the present disclosure.

FIG. 8 shows a diagram of a system 800 including a device 805 that supports adaptive determination of constellation point usage probabilities in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting adaptive determination of constellation point usage probabilities). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving, from a network entity, a request associated with probabilities of respective points of a constellation for communication of a set of data symbols over a channel between the UE and the network entity, where the probabilities indicate respective likelihoods of the respective points being used in the communication of the set of data symbols. The communications manager 820 is capable of, configured to, or operable to support a means for communicating, with the network entity, signaling in accordance with a set of probabilities of the respective points, where the set of probabilities are adapted to characteristics of RF impairments associated with the channel that are measured by the UE.

By including or configuring the communications manager 820 in accordance with examples as described herein, the device 805 may support techniques for adapting non-uniform prior probabilities to changing RF impairments, changing channel characteristics, or both, to improve a performance (e.g., SNR) of communications using a channel while maintaining throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of adaptive determination of constellation point usage probabilities as described herein, or the at least one processor 840 and the at least one memory 830 may be otherwise configured to, individually or collectively, perform or support such operations.

Figure 9:
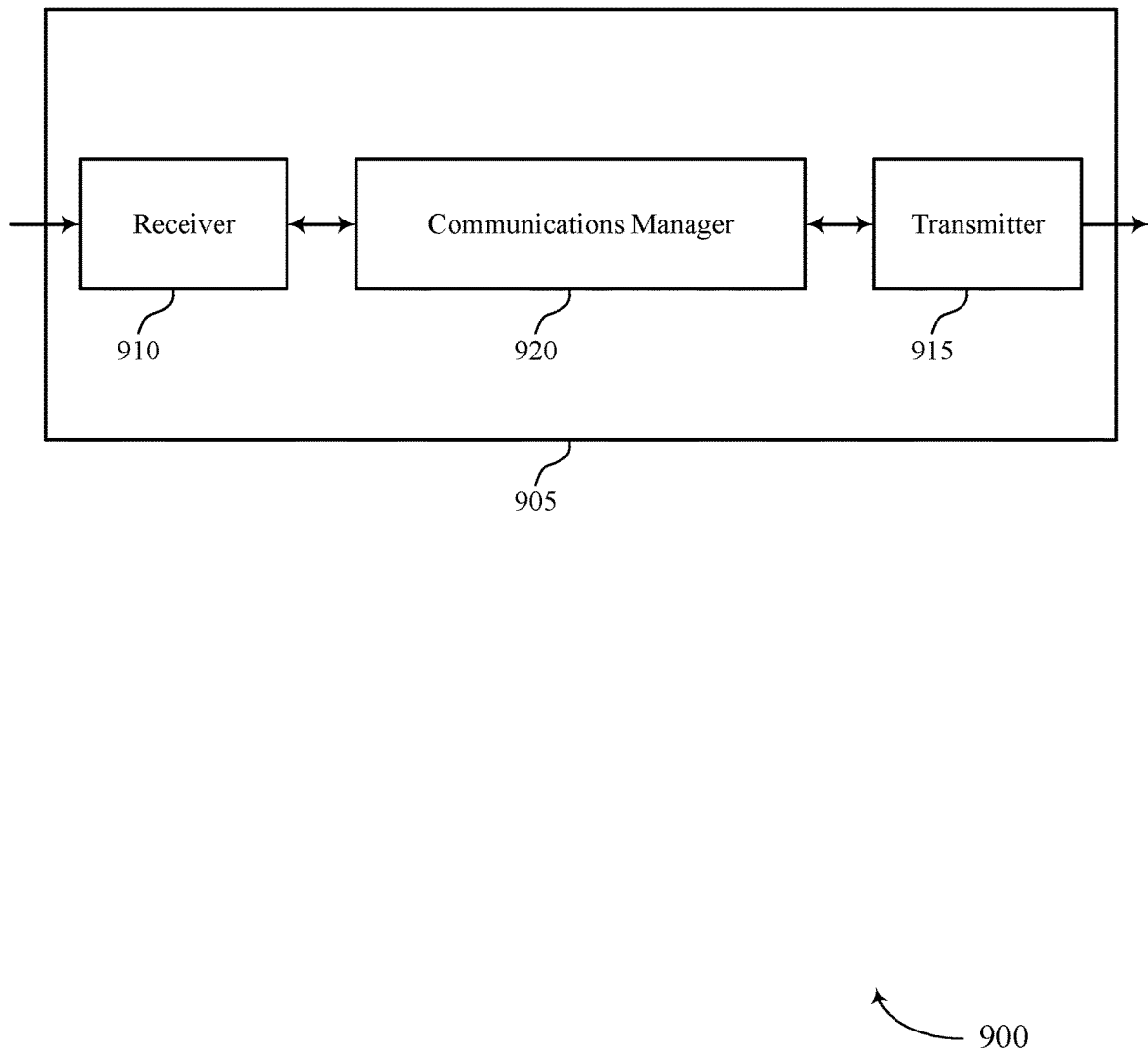
FIGS. 9 and 10 show block diagrams of devices that support adaptive determination of constellation point usage probabilities in accordance with one or more aspects of the present disclosure.

FIG. 9 shows a block diagram 900 of a device 905 that supports adaptive determination of constellation point usage probabilities in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., IQ samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., IQ samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of adaptive determination of constellation point usage probabilities as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for transmitting, to a UE, a request associated with probabilities of respective points of a constellation for communication of a set of data symbols over a channel between the UE and the network entity, where the probabilities indicate respective likelihoods of the respective points being used in the communication of the set of data symbols. The communications manager 920 is capable of, configured to, or operable to support a means for communicating, with the UE, signaling in accordance with a set of probabilities of the respective points, where the set of probabilities of the respective points are adapted to characteristics of RF impairments associated with the channel that are measured by the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for adapting non-uniform prior probabilities to changing RF impairments, changing channel characteristics, or both, to improve a performance (e.g., SNR) of communications using a channel while maintaining throughput.

Figure 10:
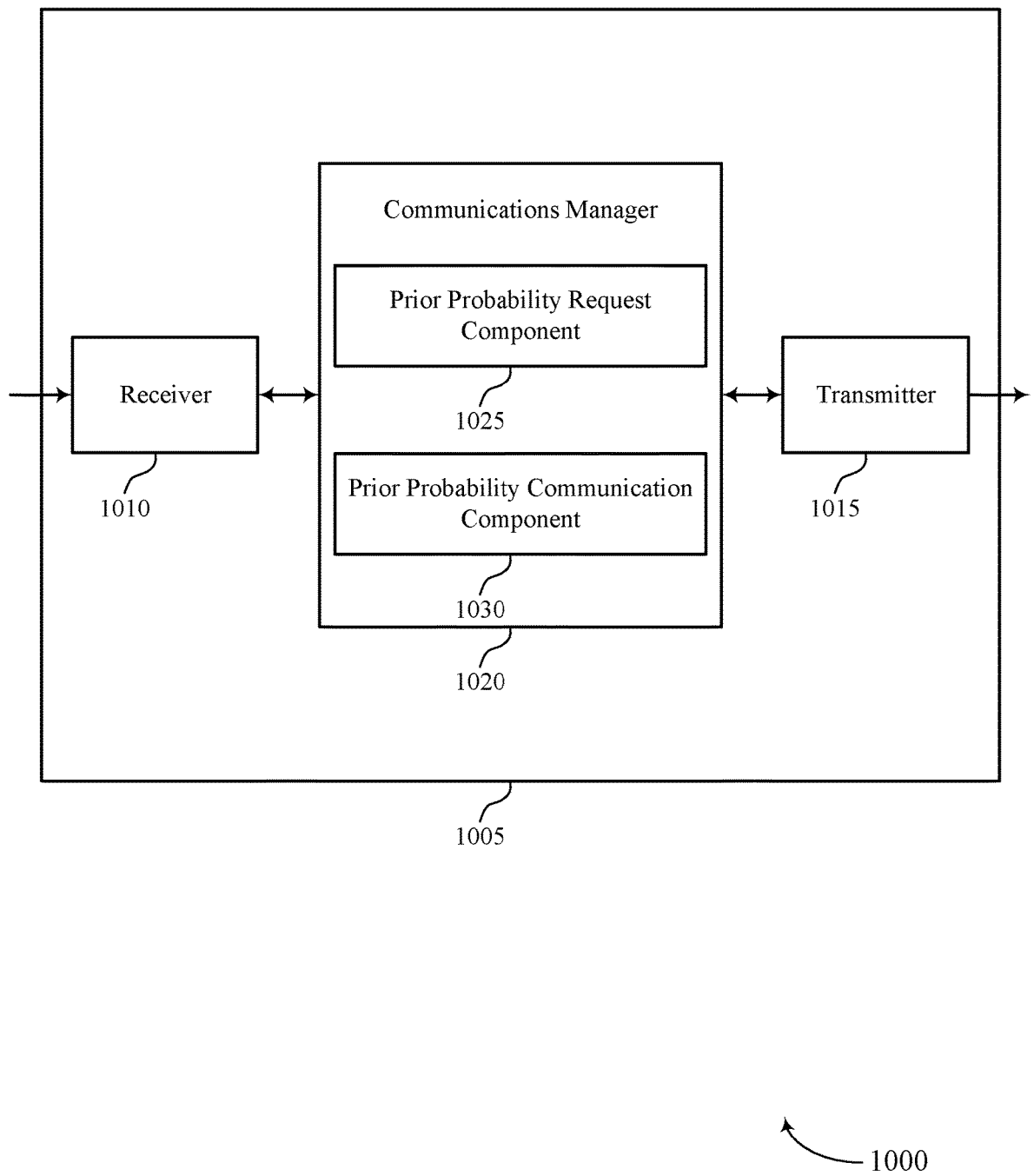

FIG. 10 shows a block diagram 1000 of a device 1005 that supports adaptive determination of constellation point usage probabilities in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., IQ samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., IQ samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of adaptive determination of constellation point usage probabilities as described herein. For example, the communications manager 1020 may include a prior probability request component 1025 a prior probability communication component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The prior probability request component 1025 is capable of, configured to, or operable to support a means for transmitting, to a UE, a request associated with probabilities of respective points of a constellation for communication of a set of data symbols over a channel between the UE and the network entity, where the probabilities indicate respective likelihoods of the respective points being used in the communication of the set of data symbols. The prior probability communication component 1030 is capable of, configured to, or operable to support a means for communicating, with the UE, signaling in accordance with a set of probabilities of the respective points, where the set of probabilities of the respective points are adapted to characteristics of RF impairments associated with the channel that are measured by the UE.

Figure 11:
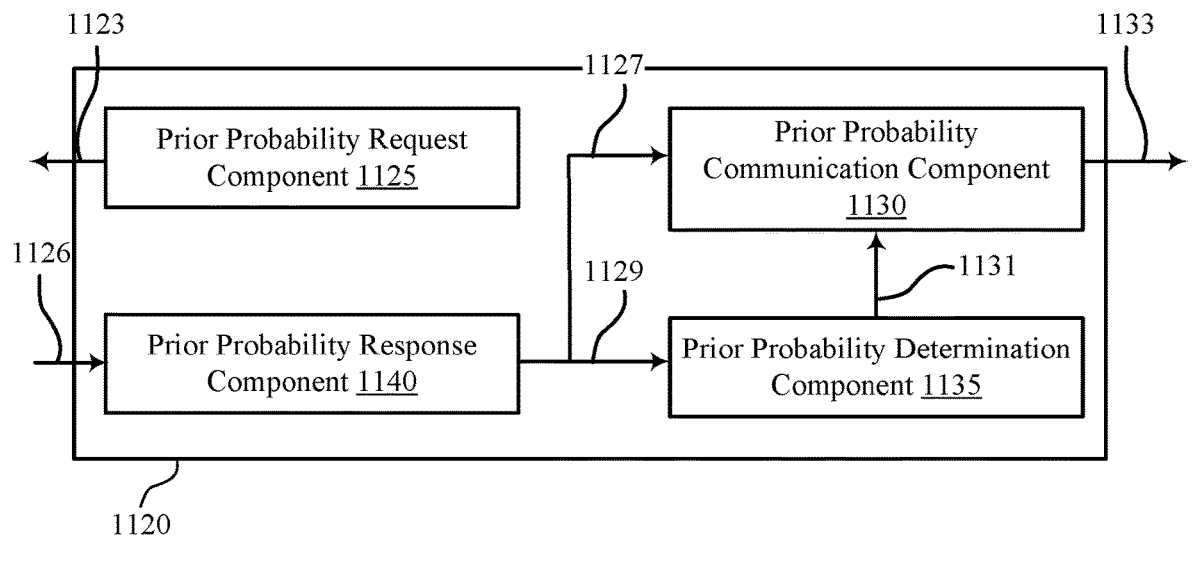
FIG. 11 shows a block diagram of a communications manager that supports adaptive determination of constellation point usage probabilities in accordance with one or more aspects of the present disclosure.

FIG. 11 shows a block diagram 1100 of a communications manager 1120 that supports adaptive determination of constellation point usage probabilities in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of adaptive determination of constellation point usage probabilities as described herein. For example, the communications manager 1120 may include a prior probability request component 1125, a prior probability communication component 1130, a prior probability determination component 1135, a prior probability response component 1140, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The prior probability request component 1125 is capable of, configured to, or operable to support a means for transmitting, to a UE, a request (e.g., the request 1123) associated with probabilities of respective points of a constellation for communication of a set of data symbols over a channel between the UE and the network entity, where the probabilities indicate respective likelihoods of the respective points being used in the communication of the set of data symbols. The prior probability communication component 1130 is capable of, configured to, or operable to support a means for communicating, with the UE, signaling (e.g., the data signaling 1133) in accordance with a set of probabilities of the respective points, where the set of probabilities of the respective points are adapted to characteristics of RF impairments associated with the channel that are measured by the UE.

In some examples, the prior probability determination component 1135 is capable of, configured to, or operable to support a means for determining, based on a response of the UE to the request, the set of probabilities. In some examples, the prior probability communication component 1130 is capable of, configured to, or operable to support a means for configuring subsequent communications between the UE and the network entity in accordance with the set of probabilities.

In some examples, the prior probability communication component 1130 is capable of, configured to, or operable to support a means for configuring, prior to transmitting the request, a second set of probabilities of the respective points, the second set of probabilities being uniformly distributed, where the set of probabilities is a first set of probabilities.

In some examples, the prior probability communication component 1130 is capable of, configured to, or operable to support a means for transmitting, to the UE, after transmitting the request and prior to communicating the signaling, second signaling indicating the set of probabilities.

In some examples, the prior probability determination component 1135 is capable of, configured to, or operable to support a means for selecting, from among a set of multiple sets of probabilities of the respective points, the set of probabilities, where the second signaling includes an index of the set of probabilities.

In some examples, the prior probability request component 1125 is capable of, configured to, or operable to support a means for requesting, in the request, for the UE to determine the probabilities for the respective points. In some examples, the prior probability response component 1140 is capable of, configured to, or operable to support a means for receiving, in response to the request and prior to communicating the signaling, second signaling that indicates the set of probabilities of the respective points determined by the UE.

In some examples, the prior probability communication component 1130 is capable of, configured to, or operable to support a means for configuring subsequent communications between the UE and the network entity based on the set of probabilities of the respective points of the constellation received in the second signaling.

In some examples, the prior probability request component 1125 is capable of, configured to, or operable to support a means for requesting, in the request, for the UE to report the characteristics of RF impairments. In some examples, the prior probability response component 1140 is capable of, configured to, or operable to support a means for receiving, in response to the request and prior to communicating the signaling, the characteristics of RF impairments measured by the UE. In some examples, the prior probability response component 1140 is capable of, configured to, or operable to support a means for receiving the response 1126 to the request 1123, where the response may include characteristics of RF impairments, prior probabilities determined by the UE, or both. In some examples, the prior probability response component 1140 is capable of, configured to, or operable to support a means for sending the characteristics of RF impairments 1129, to the prior probability communication component 1130 and the prior probabilities 1127 to the prior probability determination component 1135.

In some examples, the prior probability determination component 1135 is capable of, configured to, or operable to support a means for calculating, based on the characteristics of RF impairments received from the UE, respective values of the probabilities. In some examples, the prior probability determination component 1135 is capable of, configured to, or operable to support a means for sending the calculated prior probabilities 1131 to the prior probability communication component 1130.

In some examples, the prior probability communication component 1130 is capable of, configured to, or operable to support a means for transmitting, based on calculating the respective values of the probabilities, second signaling that indicates the set of probabilities.

In some examples, the second signaling includes the set of probabilities.

In some examples, the prior probability determination component 1135 is capable of, configured to, or operable to support a means for selecting, from among a set of multiple sets of probabilities of the respective points based on the calculated respective values of the probabilities, the set of probabilities of the respective points, where the second signaling includes an index of the set of probabilities.

Figure 12:
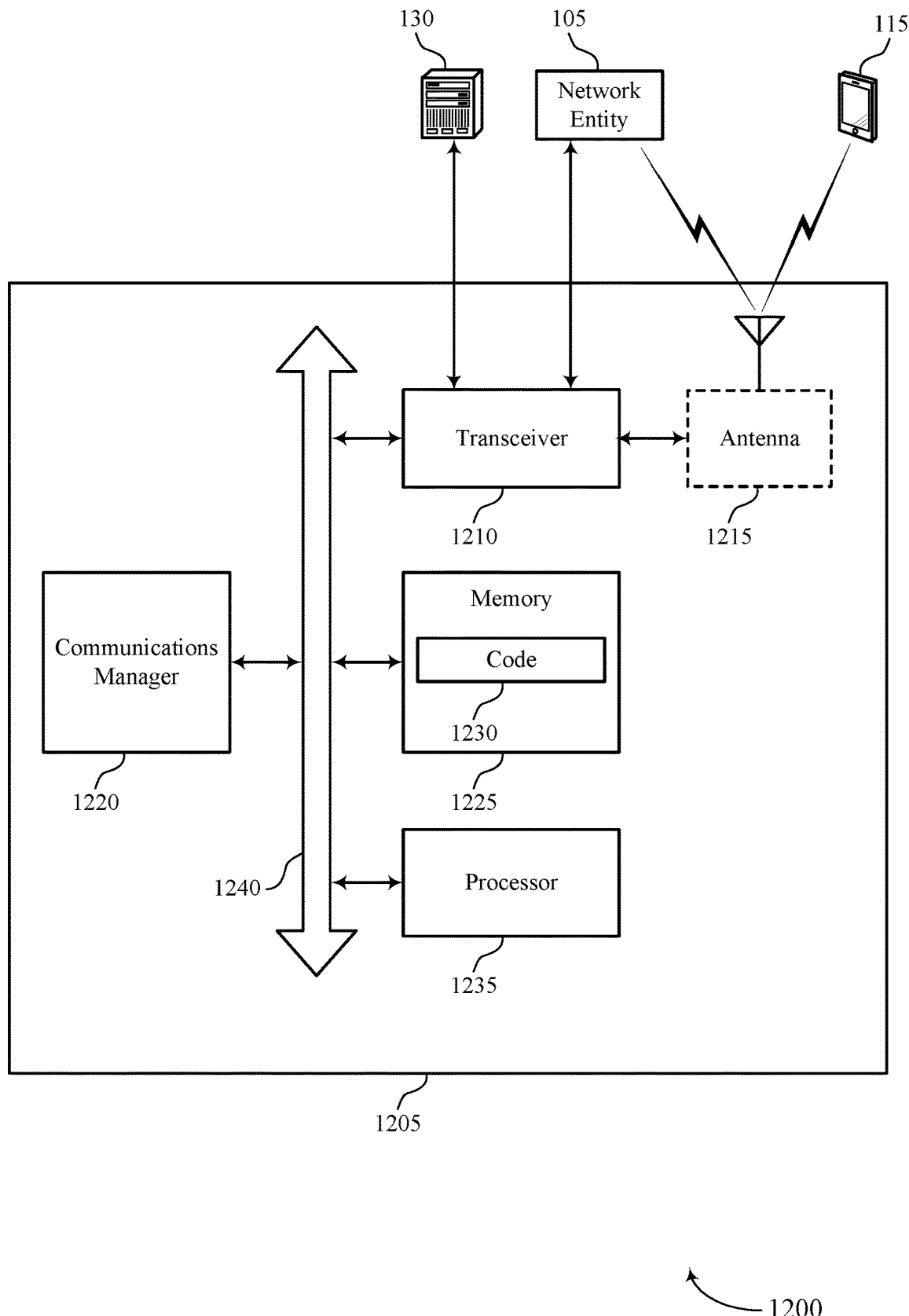
FIG. 12 shows a diagram of a system including a device that supports adaptive determination of constellation point usage probabilities in accordance with one or more aspects of the present disclosure.

FIG. 12 shows a diagram of a system 1200 including a device 1205 that supports adaptive determination of constellation point usage probabilities in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting adaptive determination of constellation point usage probabilities). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for transmitting, to a UE, a request associated with probabilities of respective points of a constellation for communication of a set of data symbols over a channel between the UE and the network entity, where the probabilities indicate respective likelihoods of the respective points being used in the communication of the set of data symbols. The communications manager 1220 is capable of, configured to, or operable to support a means for communicating, with the UE, signaling in accordance with a set of probabilities of the respective points, where the set of probabilities of the respective points are adapted to characteristics of RF impairments associated with the channel that are measured by the UE.

By including or configuring the communications manager 1220 in accordance with examples as described herein, the device 1205 may support techniques for adapting non-uniform prior probabilities to changing RF impairments, changing channel characteristics, or both, to improve a performance (e.g., SNR) of communications using a channel while maintaining throughput.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of adaptive determination of constellation point usage probabilities as described herein, or the at least one processor 1235 and the at least one memory 1225 may be otherwise configured to, individually or collectively, perform or support such operations.

Figure 13:
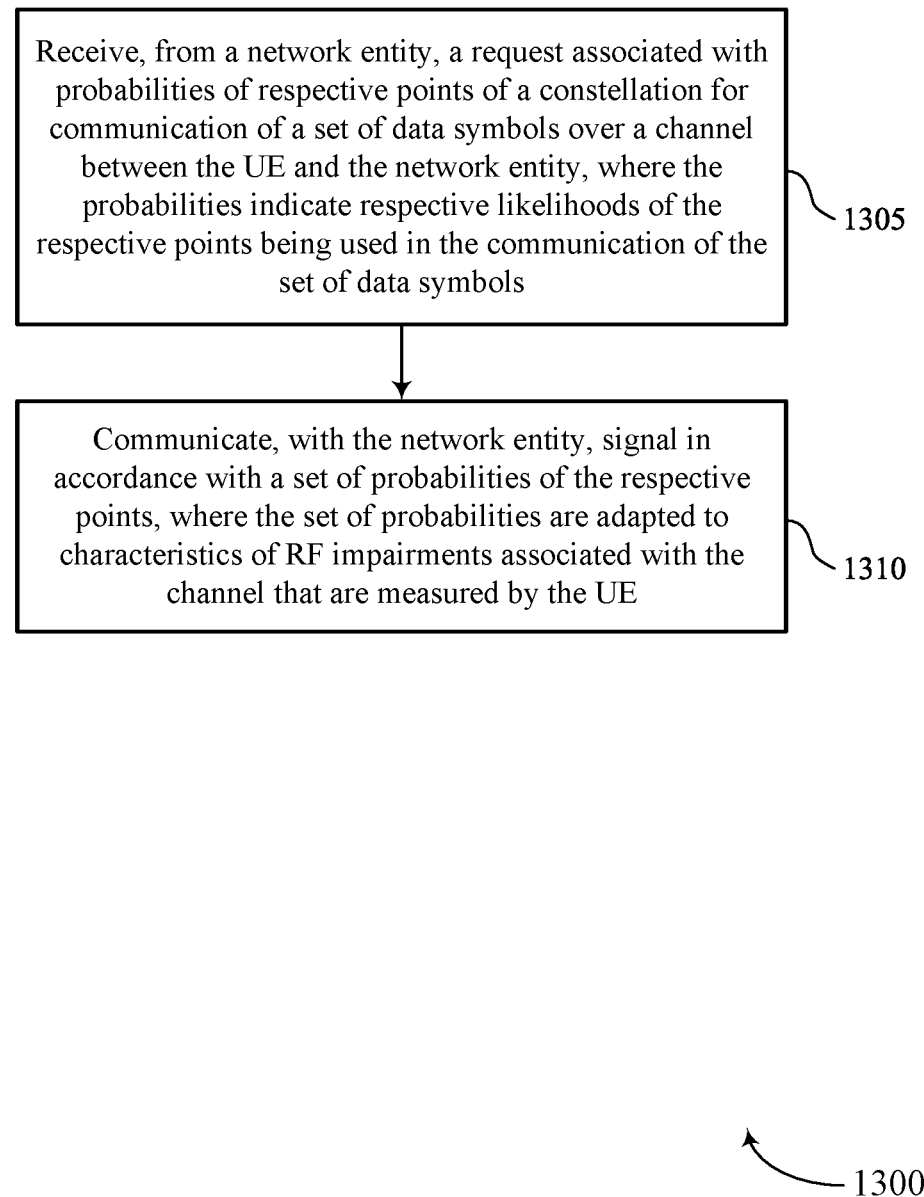
FIGS. 13 and 14 show flowcharts illustrating methods that support adaptive determination of constellation point usage probabilities in accordance with one or more aspects of the present disclosure.

FIG. 13 shows a flowchart illustrating a method 1300 that supports adaptive determination of constellation point usage probabilities in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a request associated with probabilities of respective points of a constellation for communication of a set of data symbols over a channel between the UE and the network entity, where the probabilities indicate respective likelihoods of the respective points being used in the communication of the set of data symbols. The operations of block 1305 may be performed in accordance with examples as disclosed herein. In some examples, aspects of the operations of 1305 may be performed by a prior probability request component 725 as described with reference to FIG. 7.

At 1310, the method may include communicating, with the network entity, signaling in accordance with a set of probabilities of the respective points, where the set of probabilities are adapted to characteristics of RF impairments associated with the channel that are measured by the UE. The operations of block 1310 may be performed in accordance with examples as disclosed herein. In some examples, aspects of the operations of 1310 may be performed by a prior probability communication component 730 as described with reference to FIG. 7.

Figure 14:
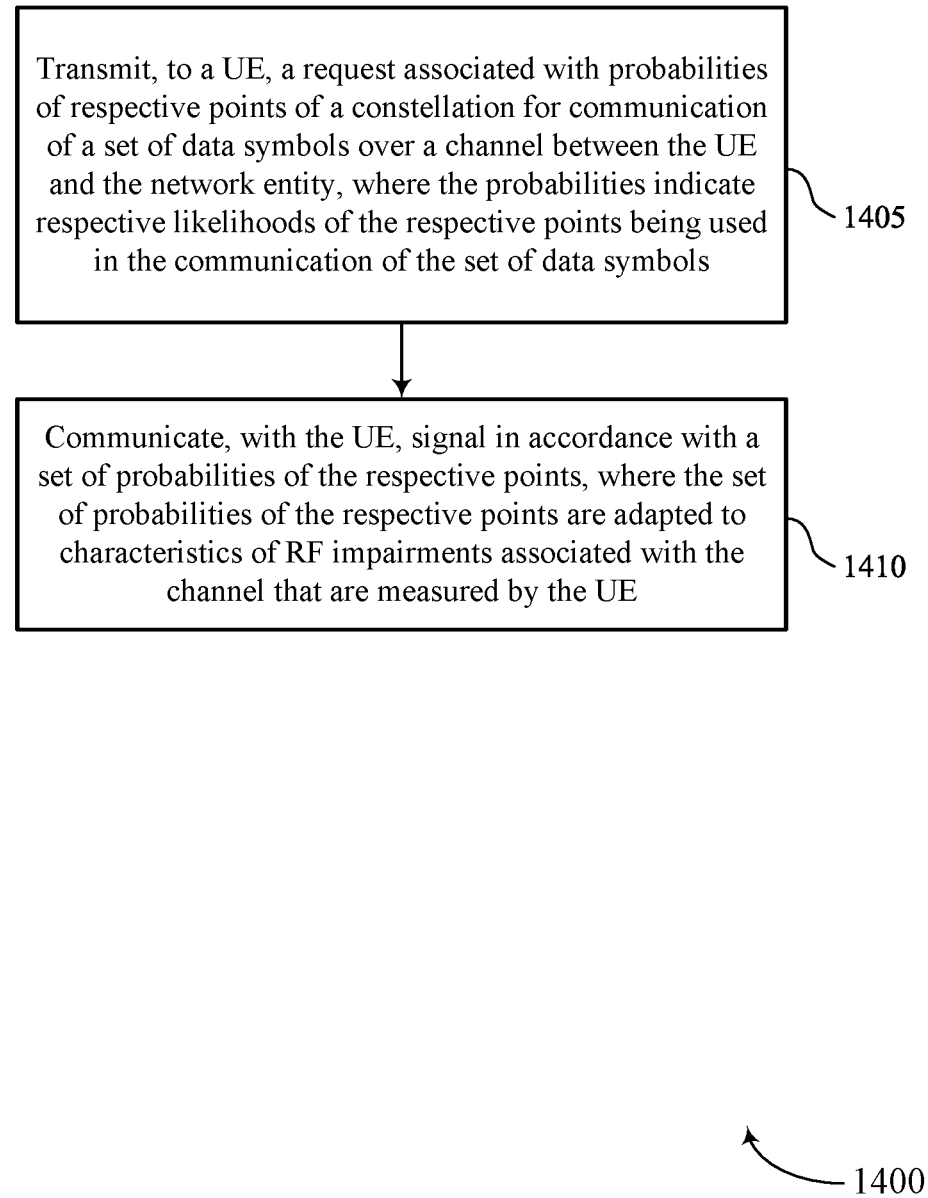

FIG. 14 shows a flowchart illustrating a method 1400 that supports adaptive determination of constellation point usage probabilities in accordance with aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, a request associated with probabilities of respective points of a constellation for communication of a set of data symbols over a channel between the UE and the network entity, where the probabilities indicate respective likelihoods of the respective points being used in the communication of the set of data symbols. The operations of block 1405 may be performed in accordance with examples as disclosed herein. In some examples, aspects of the operations of 1405 may be performed by a prior probability request component 1125 as described with reference to FIG. 11.

At 1410, the method may include communicating, with the UE, signaling in accordance with a set of probabilities of the respective points, where the set of probabilities of the respective points are adapted to characteristics of RF impairments associated with the channel that are measured by the UE. The operations of block 1410 may be performed in accordance with examples as disclosed herein. In some examples, aspects of the operations of 1410 may be performed by a prior probability communication component 1130 as described with reference to FIG. 11.

The following provides an overview of aspects of the present disclosure:

Aspect 1: A method for wireless communication by a UE, comprising: receiving, from a network entity, a request associated with probabilities of respective points of a constellation for communication of a set of data symbols over a channel between the UE and the network entity, wherein the probabilities indicate respective likelihoods of the respective points being used in the communication of the set of data symbols; and communicating, with the network entity, signaling in accordance with a set of probabilities of the respective points, wherein the set of probabilities are adapted to characteristics of RF impairments associated with the channel that are measured by the UE.

Aspect 2: The method of aspect 1, further comprising: measuring, in response to the request, the characteristics of RF impairments, wherein the characteristics of RF impairments comprise non-linear characteristics, phase noise characteristics, in-phase/quadrature imbalance characteristics, radio frequency spur characteristics, or any combination thereof.

Aspect 3: The method of aspect 2, further comprising: measuring, as part of measuring the characteristics of RF impairments, the non-linear characteristics, and measuring, as part of measuring the characteristics of RF impairments and after measuring the non-linear characteristics, the phase noise characteristics.

Aspect 4: The method of any of aspects 1 through 3, further comprising: receiving, after receiving the request and prior to communicating the signaling, second signaling indicating the set of probabilities.

Aspect 5: The method of any of aspects 1 through 4, further comprising: demodulating, based at least in part on communicating the signaling, symbols in the signaling in accordance with the set of probabilities.

Aspect 6: The method of any of aspects 1 through 5, further comprising: determining that the request is requesting the probabilities for the respective points; and calculating, in response to the request and based at least in part on the characteristics of RF impairments, respective values for the probabilities, wherein the set of probabilities for the communicating are based at least in part on the calculated respective values of the probabilities.

Aspect 7: The method of aspect 6, further comprising: selecting, based at least in part on the calculated respective values of the probabilities, and from among a plurality of sets of probabilities of the respective points, the set of probabilities; and transmitting, to the network entity and based at least in part on selecting the set of probabilities, second signaling comprising an index of the set of probabilities.

Aspect 8: The method of any of aspects 6 through 7, further comprising: transmitting, to the network entity and in response to the request, second signaling comprising the calculated respective values of the probabilities.

Aspect 9: The method of aspect 8, further comprising: receiving, from the network entity, prior to communicating the signaling and based at least in part on transmitting the second signaling, an indication that the set of probabilities is configured for subsequent communications between the UE and the network entity.

Aspect 10: The method of any of aspects 1 through 5, further comprising: determining that the request is requesting the characteristics of RF impairments; and transmitting, to the network entity and in response to the request, second signaling that indicates the characteristics of RF impairments measured by the UE.

Aspect 11: The method of aspect 10, further comprising: receiving, from the network entity, prior to communicating the signaling and based at least in part on transmitting the second signaling, third signaling that indicates the set of probabilities, wherein the set of probabilities is based at least in part on values of the probabilities of the respective points calculated by the network entity using the characteristics of the RF impairments measured by the UE.

Aspect 12: The method of aspect 11, wherein the third signaling comprises an index of the set of probabilities, the set of probabilities being selected from among a plurality of sets of probabilities of the respective points.

Aspect 13: A method for wireless communication by a network entity, comprising: transmitting, to a UE, a request associated with probabilities of respective points of a constellation for communication of a set of data symbols over a channel between the UE and the network entity, wherein the probabilities indicate respective likelihoods of the respective points being used in the communication of the set of data symbols; and communicating, with the UE, signaling in accordance with a set of probabilities of the respective points, wherein the set of probabilities of the respective points are adapted to characteristics of RF impairments associated with the channel that are measured by the UE.

Aspect 14: The method of aspect 13, further comprising: determining, based at least in part on a response of the UE to the request, the set of probabilities; and configuring subsequent communications between the UE and the network entity in accordance with the set of probabilities.

Aspect 15: The method of any of aspects 13 through 14, further comprising: configuring, prior to transmitting the request, a second set of probabilities of the respective points, the second set of probabilities being uniformly distributed, wherein the set of probabilities is a first set of probabilities.

Aspect 16: The method of any of aspects 13 through 15, further comprising: transmitting, to the UE, after transmitting the request and prior to communicating the signaling, second signaling indicating the set of probabilities.

Aspect 17: The method of aspect 16, further comprising: selecting, from among a plurality of sets of probabilities of the respective points, the set of probabilities, wherein the second signaling comprises an index of the set of probabilities Aspect 18: The method of any of aspects 13 through 17, further comprising: requesting, in the request, for the UE to determine the probabilities for the respective points; and receiving, in response to the request and prior to communicating the signaling, second signaling that indicates the set of probabilities of the respective points determined by the UE.

Aspect 19: The method of aspect 18, further comprising: configuring subsequent communications between the UE and the network entity based at least in part on the set of probabilities of the respective points of the constellation received in the second signaling.

Aspect 20: The method of any of aspects 13 through 17, further comprising: requesting, in the request, for the UE to report the characteristics of RF impairments; and receiving, in response to the request and prior to communicating the signaling, the characteristics of RF impairments measured by the UE.

Aspect 21: The method of aspect 20, further comprising: calculating, based at least in part on the characteristics of RF impairments received from the UE, respective values of the probabilities.

Aspect 22: The method of aspect 21, further comprising: transmitting, based at least in part on calculating the respective values of the probabilities, second signaling that indicates the set of probabilities.

Aspect 23: The method of aspect 22, wherein the second signaling comprises the set of probabilities.

Aspect 24: The method of any of aspects 22 through 23, further comprising: selecting, from among a plurality of sets of probabilities of the respective points based at least in part on the calculated respective values of the probabilities, the set of probabilities of the respective points, wherein the second signaling comprises an index of the set of probabilities.

Aspect 25: A UE for wireless communication, comprising one or more memories storing processor-executable code, and one or more processors coupled with the one or more memories and individually or collectively operable to execute the code to cause the UE to perform a method of any of aspects 1 through 12.

Aspect 26: A UE for wireless communication, comprising at least one means for performing a method of any of aspects 1 through 12.

Aspect 27: A non-transitory computer-readable medium storing code for wireless communication, the code comprising instructions executable by a processor to perform a method of any of aspects 1 through 12.

Aspect 28: A network entity for wireless communication, comprising one or more memories storing processor-executable code, and one or more processors coupled with the one or more memories and individually or collectively operable to execute the code to cause the network entity to perform a method of any of aspects 13 through 24.

Aspect 29: A network entity for wireless communication, comprising at least one means for performing a method of any of aspects 13 through 24.

Aspect 30: A non-transitory computer-readable medium storing code for wireless communication, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
      receive, from a network entity, a request associated with probabilities of respective points of a constellation for communication of a set of data symbols over a channel between the UE and the network entity, wherein the probabilities indicate respective likelihoods of the respective points being used in the communication of the set of data symbols; and
      communicate, with the network entity, signaling in accordance with a set of probabilities of the respective points, wherein the set of probabilities are adapted to characteristics of radio frequency impairments associated with the channel that are measured by the UE.

2. The UE of claim 1, wherein the one or more processors are individually or collectively further operable to execute the code to cause the UE to:
   measure, in response to the request, the characteristics of radio frequency impairments, wherein the characteristics of radio frequency impairments comprise non-linear characteristics, phase noise characteristics, in-phase/quadrature imbalance characteristics, radio frequency spur characteristics, or any combination thereof.

3. The UE of claim 2, wherein the one or more processors are individually or collectively further operable to execute the code to cause the UE to:
   measure, as part of measuring the characteristics of radio frequency impairments, the non-linear characteristics, and
   measure, as part of measuring the characteristics of radio frequency impairments and after measuring the non-linear characteristics, the phase noise characteristics.

4. The UE of claim 1, wherein the one or more processors are individually or collectively further operable to execute the code to cause the UE to:
   receive, after receiving the request and prior to communicating the signaling, second signaling indicating the set of probabilities.

5. The UE of claim 1, wherein the one or more processors are individually or collectively further operable to execute the code to cause the UE to:
   demodulate, based at least in part on communicating the signaling, symbols in the signaling in accordance with the set of probabilities.

6. The UE of claim 1, wherein the one or more processors are individually or collectively further operable to execute the code to cause the UE to:
   determine that the request is requesting the probabilities for the respective points; and
   calculate, in response to the request and based at least in part on the characteristics of radio frequency impairments, respective values for the probabilities, wherein the set of probabilities for the communicating are based at least in part on the calculated respective values of the probabilities.

7. The UE of claim 6, wherein the one or more processors are individually or collectively further operable to execute the code to cause the UE to:
   select, based at least in part on the calculated respective values of the probabilities, and from among a plurality of sets of probabilities of the respective points, the set of probabilities; and
   transmit, to the network entity and based at least in part on selecting the set of probabilities, second signaling comprising an index of the set of probabilities.

8. The UE of claim 6, wherein the one or more processors are individually or collectively further operable to execute the code to cause the UE to:
   transmit, to the network entity and in response to the request, second signaling comprising the calculated respective values of the probabilities.

9. The UE of claim 8, wherein the one or more processors are individually or collectively further operable to execute the code to cause the UE to:
   receive, from the network entity, prior to communicating the signaling and based at least in part on transmitting the second signaling, an indication that the set of probabilities is configured for subsequent communications between the UE and the network entity.

10. The UE of claim 1, wherein the one or more processors are individually or collectively further operable to execute the code to cause the UE to:
    determine that the request is requesting the characteristics of radio frequency impairments; and
    transmit, to the network entity and in response to the request, second signaling that indicates the characteristics of radio frequency impairments measured by the UE.

11. The UE of claim 10, wherein the one or more processors are individually or collectively further operable to execute the code to cause the UE to:
    receive, from the network entity, prior to communicating the signaling and based at least in part on transmitting the second signaling, third signaling that indicates the set of probabilities, wherein the set of probabilities is based at least in part on values of the probabilities of the respective points calculated by the network entity using the characteristics of radio frequency impairments measured by the UE.

12. The UE of claim 11, wherein the third signaling comprises an index of the set of probabilities, the set of probabilities being selected from among a plurality of sets of probabilities of the respective points.

13. A network entity for wireless communication, comprising:
one or more memories storing processor-executable code; and
one or more processors coupled with the one or more memories and individually or collectively operable to execute the code to cause the network entity to:
transmit, to a user equipment (UE), a request associated with probabilities of respective points of a constellation for communication of a set of data symbols over a channel between the UE and the network entity, wherein the probabilities indicate respective likelihoods of the respective points being used in the communication of the set of data symbols; and
communicate, with the UE, signaling in accordance with a set of probabilities of the respective points, wherein the set of probabilities of the respective points are adapted to characteristics of radio frequency impairments associated with the channel that are measured by the UE.

14. The network entity of claim 13, wherein the one or more processors are individually or collectively further operable to execute the code to cause the network entity to:
determine, based at least in part on a response of the UE to the request, the set of probabilities; and
configure subsequent communications between the UE and the network entity in accordance with the set of probabilities.

15. The network entity of claim 13, wherein the set of probabilities is a first set of probabilities, and wherein the one or more processors are individually or collectively further operable to execute the code to cause the network entity to:
configure, prior to transmitting the request, a second set of probabilities of the respective points, the second set of probabilities being uniformly distributed.

16. The network entity of claim 13, wherein the one or more processors are individually or collectively further operable to execute the code to cause the network entity to:
transmit, to the UE, after transmitting the request and prior to communicating the signaling, second signaling indicating the set of probabilities.

17. The network entity of claim 16, wherein the one or more processors are individually or collectively further operable to execute the code to cause the network entity to:
select, from among a plurality of sets of probabilities of the respective points, the set of probabilities, wherein the second signaling comprises an index of the set of probabilities.

18. The network entity of claim 13, wherein the one or more processors are individually or collectively further operable to execute the code to cause the network entity to:
request, in the request, for the UE to determine the probabilities for the respective points; and
receive, in response to the request and prior to communicating the signaling, second signaling that indicates the set of probabilities of the respective points determined by the UE.

19. The network entity of claim 18, wherein the one or more processors are individually or collectively further operable to execute the code to cause the network entity to:
configure subsequent communications between the UE and the network entity based at least in part on the set of probabilities of the respective points of the constellation received in the second signaling.

20. The network entity of claim 13, wherein the one or more processors are individually or collectively further operable to execute the code to cause the network entity to:
request, in the request, for the UE to report the characteristics of radio frequency impairments; and
receive, in response to the request and prior to communicating the signaling, the characteristics of radio frequency impairments measured by the UE.

21. The network entity of claim 20, wherein the one or more processors are individually or collectively further operable to execute the code to cause the network entity to:
calculate, based at least in part on the characteristics of radio frequency impairments received from the UE, respective values of the probabilities.

22. The network entity of claim 21, wherein the one or more processors are individually or collectively further operable to execute the code to cause the network entity to:
transmit, based at least in part on calculating the respective values of the probabilities, second signaling that indicates the set of probabilities.

23. The network entity of claim 22, wherein the second signaling comprises the set of probabilities.

24. The network entity of claim 22, wherein the one or more processors are individually or collectively further operable to execute the code to cause the network entity to:
select, from among a plurality of sets of probabilities of the respective points based at least in part on the calculated respective values of the probabilities, the set of probabilities of the respective points, wherein the second signaling comprises an index of the set of probabilities.

25. A method for wireless communication by a user equipment (UE), comprising:
receiving, from a network entity, a request associated with probabilities of respective points of a constellation for communication of a set of data symbols over a channel between the UE and the network entity, wherein the probabilities indicate respective likelihoods of the respective points being used in the communication of the set of data symbols; and
communicating, with the network entity, signaling in accordance with a set of probabilities of the respective points, wherein the set of probabilities are adapted to characteristics of radio frequency impairments associated with the channel that are measured by the UE.

26. The method of claim 25, further comprising:
measuring, in response to the request, the characteristics of radio frequency impairments, wherein the characteristics of radio frequency impairments comprise non-linear characteristics, phase noise characteristics, in-phase/quadrature imbalance characteristics, radio frequency spur characteristics, or any combination thereof.

27. The method of claim 26, further comprising:
measuring, as part of measuring the characteristics of radio frequency impairments, the non-linear characteristics, and measuring, as part of measuring the characteristics of radio frequency impairments and after measuring the non-linear characteristics, the phase noise characteristics.

28. The method of claim 25, further comprising:
receiving, after receiving the request and prior to communicating the signaling, second signaling indicating the set of probabilities.

29. A method for wireless communication by a network entity, comprising:
transmitting, to a user equipment (UE), a request associated with probabilities of respective points of a constellation for communication of a set of data symbols over a channel between the UE and the network entity, wherein the probabilities indicate respective likelihoods of the respective points being used in the communication of the set of data symbols; and
communicating, with the UE, signaling in accordance with a set of probabilities of the respective points, wherein the set of probabilities of the respective points are adapted to characteristics of radio frequency impairments associated with the channel that are measured by the UE.

30. The method of claim 29, further comprising:
determining, based at least in part on a response of the UE to the request, the set of probabilities; and
configuring subsequent communications between the UE and the network entity in accordance with the set of probabilities.

* * * * *